(12) United States Patent
Iino et al.

(10) Patent No.: US 8,490,104 B2
(45) Date of Patent: Jul. 16, 2013

(54) METHOD AND APPARATUS FOR RESERVATION AND REALLOCATION OF SURPLUS RESOURCES TO PROCESSES IN AN EXECUTION SPACE BY A LOCAL RESOURCE MANAGER AFTER THE EXECUTION SPACE IS GENERATED SUCCEEDING THE INITIALIZATION OF AN APPLICATION FOR WHICH THE EXECUTION SPACE IS CREATED AND THE RESOURCES ARE ALLOCATED TO THE EXECUTION SPACE BY A GLOBAL RESOURCE MANAGER PRIOR TO APPLICATION EXECUTION

(75) Inventors: Yoichiro Iino, Tokyo (JP); Atsushi Hamano, Tokyo (JP); Jun Saito, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1133 days.

(21) Appl. No.: 12/066,130
(22) PCT Filed: Oct. 6, 2006
(86) PCT No.: PCT/JP2006/320138
§ 371 (c)(1), (2), (4) Date: Mar. 7, 2008
(87) PCT Pub. No.: WO2007/052443
PCT Pub. Date: May 10, 2007

(65) Prior Publication Data
US 2009/0158279 A1    Jun. 18, 2009

(30) Foreign Application Priority Data
Oct. 31, 2005  (JP) .................................. 2005-317713

(51) Int. Cl.
*G06F 9/455*  (2006.01)
*G06F 9/46*   (2006.01)
*G06F 9/30*   (2006.01)

(52) U.S. Cl.
USPC ................................ 718/104; 718/1; 712/216

(58) Field of Classification Search
USPC ........................ 718/104, 1; 712/216
See application file for complete search history.

(56) References Cited

U.S. PATENT DOCUMENTS 6,279,091 B1   8/2001  Kikuchi et al.
7,117,499 B2  10/2006  Kawamoto et al.
(Continued)

FOREIGN PATENT DOCUMENTS

JP    6370342 A    3/1988
JP    7-311688     11/1995
(Continued)

OTHER PUBLICATIONS

Tullman P et al: "Nested Java Processes OS Structure for Mobile Code" Internet Citation, (Online) Sep. 7, 1998.
(Continued)

*Primary Examiner* — Thomas Lee
*Assistant Examiner* — Terrell Johnson
(74) *Attorney, Agent, or Firm* — Matthew B. Dernier, Esq.; Gibson & Dernier LLP

(57) ABSTRACT

A certain process included in a first execution space requests a local resource manager to allocate a resource. The local resource manager obtains the authentication ID of the process issuing the request and determines whether or not the resource can be allocated. If the resource can be allocated and the resource previously secured in the execution space can suffice the request, the local resource manager allocates the resource to the process. If the resource is insufficient, the local resource manager requests a global resource manager to allocate the resource. The global resource manager obtains the authentication ID of the first execution space issuing the request and determines whether or not the resource can be allocated. If it is determined that the resource can be allocated, the resource is allocated to the first execution space.

16 Claims, 22 Drawing Sheets

U.S. PATENT DOCUMENTS

| | | | |
|---|---|---|---|
| 7,669,202 B1* | 2/2010 | Tene et al. ................. 718/1 |
| 2002/0016812 A1 | 2/2002 | Uchishiba et al. |
| 2003/0097393 A1 | 5/2003 | Kawamoto et al. |
| 2003/0233446 A1 | 12/2003 | Earl |
| 2004/0143664 A1* | 7/2004 | Usa et al. ................. 709/226 |
| 2005/0114860 A1* | 5/2005 | Lin et al. ................. 718/100 |
| 2005/0154861 A1* | 7/2005 | Arimilli et al. ................. 712/216 |
| 2005/0172293 A1* | 8/2005 | Petruncola et al. ........... 718/105 |
| 2005/0235288 A1 | 10/2005 | Yamakabe et al. |
| 2006/0005198 A1 | 1/2006 | Uchishiba et al. |
| 2006/0143325 A1 | 6/2006 | Taniguchi |
| 2006/0288348 A1 | 12/2006 | Kawamoto et al. |
| 2007/0106993 A1* | 5/2007 | Largman et al. ............. 718/104 |

FOREIGN PATENT DOCUMENTS

| | | |
|---|---|---|
| JP | 8-123700 | 5/1996 |
| JP | 2713079 | 10/1997 |
| JP | 10-78938 | 3/1998 |
| JP | 200241304 A | 2/2002 |
| JP | 2003131894 A | 5/2003 |
| JP | 2003157177 A | 5/2003 |
| JP | 2004199561 A | 7/2004 |
| JP | 2005-530240 T | 10/2005 |
| JP | 2006-209735 | 10/2006 |

OTHER PUBLICATIONS

Supplementary European Search Report for corresponding European application EP 06811465, Apr. 3, 2009.

Office Action for corresponding Japanese Patent Application 2005-317713, dated: Jun. 16, 2009.

Office Action for corresponding Chinese Patent Application 200680027256.5, dated: Jul. 17, 2009.

Patrick Tullman et al., "Nested Java Processes: OS Structure for Mobile Code", Proceedings of Eighth ACM SIGOPS European Workshop on Support for composing distributed applications, 1998 Nen 9 Gatsu 10 Nichi, p. 111-117 [retrieved from: http://www.cs.utah.edu/flux/papers/npmjava-esigops98web.pdf].

International Search Report for International application PCT/JP2006/320138.

International Preliminary Report on Patentability for International application PCT/JP2006/320138.

Japanese Office Action for corresponding Japanese application JP2005-317713, Mar. 24, 2009.

* cited by examiner

FIG.5

| EXECUTION SPACE AUTHENTI- CATION ID | MAXIMUM MEMORY AMOUNT | MAXIMUM CPU TIME | AVAILABLE DEVICE ID | MAXIMUM HARD DISK SPACE | EXECUTION SPACE INITIALIZATION PARAMETER | TO-BE-STARTED PROGRAM LIST |
|---|---|---|---|---|---|---|
| 0x0014 | 1000 MB | 10/100 | 0x10, 0x20, | 2 GB | Param_A | Prg_List_A |
| 0x0015 | 2000 MB | 20/100 | 0x11, 0x20 | 5 GB | Param_B | Prg_List_B |
| 0x0020 | 500 MB | 20/100 | 0x20 | 1 GB | Param_C | Prg_List_C |
| .. | .. | .. | .. | .. | .. | .. |

| | | |
|---|---|---|
| 202 | INITIALLY-SECURED MEMORY AMOUNT | 200 MB |
| 204 | ADDITIONALLY-SECURED MEMORY AMOUNT UNIT | 100 MB |
| 206 | INITIALLY-SECURED CPU TIME | 5/100 |
| 208 | ADDITIONALLY-SECURED CPU TIME UNIT | 1/100 |

| PROGRAM FILE NAME |
|---|
| prg1 |
| prg2 |
| prg3 |
| : |

| PROGRAM AUTHENTICATION ID (224) | MAXIMUM MEMORY AMOUNT (226) | AVAILABLE DEVICE ID (228) | HARD DISK USABILITY (230) | CODE (232) |
|---|---|---|---|---|
| 0x01a2 | 100 MB | 0x10 | OK | ..... |

| EXECUTION SPACE PROVISIONAL ID (132A) | EXECUTION SPACE AUTHENTICATION ID (104A) |
|---|---|
| 0x1234 | 0x0014 |
| 0x1111 | 0x0015 |
| 0x5782 | 0x0020 |
| : | : |

| EXECUTION SPACE AUTHENTICATION ID 104A | MAXIMUM MEMORY AMOUNT 108A | ACTUALLY-ALLOCATED MEMORY AMOUNT 144 | MAXIMUM CPU TIME 110A | ACTUALLY-ALLOCATED CPU TIME 146 | AVAILABLE DEVICE ID 112A | MAXIMUM HARD DISK SPACE 114A |
|---|---|---|---|---|---|---|
| 0x0014 | 1000 MB | 200 MB | 10/100 | 5/100 | 0x10, 0x20 | 2 GB |
| 0x0015 | 2000 MB | 40 MB | 20/100 | 20/100 | 0x11, 0x20 | 5 GB |
| 0x0020 | 500 MB | 5 MB | 20/100 | 2/100 | 0x20 | 1 GB |
| .. | .. | .. | .. | .. | .. | .. |

| | | |
|---|---|---|
| 154 | ACTUALLY-SECURED MEMORY AMOUNT | 200 MB |
| 204 | ADDITIONALLY-SECURED MEMORY AMOUNT UNIT | 100 MB |
| 156 | ACTUALLY-SECURED CPU TIME | 5/100 |
| 208 | ACTUALLY-SECURED CPU TIME UNIT | 1/100 |

| PROGRAM AUTHENTI- CATION ID 224 | ACTUALLY- ALLOCATED MEMORY AMOUNT 164 | MAXIMUM MEMORY AMOUNT 226 | ACTUALLY- ALLOCATED CPU TIME 166 | AVAILABLE DEVICE ID 228 | HARD DISK USABILITY 230 |
|---|---|---|---|---|---|
| 0x01a2 | 40 MB | 100 MB | 10/1000 | 0x10 | OK |
| 0x0122 | 20 MB | 50 MB | 20/1000 | - | - |
| 0x0503 | 20 MB | 30 MB | 10/1000 | 0x10,0x20 | OK |
| .. | .. | .. | .. | .. | .. |

| EXECUTION SPACE AUTHENTICATION ID (104A) | ALLOCATED SPACE (272) | INITIAL ADDRESS (274) |
|---|---|---|
| 0x1234 | 2 GB | 0x210000 |
| 0x1111 | 5 GB | 0x015000 |
| 0x5782 | 1 GB | 0x120000 |
| ⋮ | ⋮ | ⋮ |

| EXECUTION SPACE AUTHENTI- CATION ID 104A | MAXIMUM MEMORY AMOUNT 108A | MAXIMUM CPU TIME 110A | AVAILABLE DEVICE ID 112A | MAXIMUM HARD DISK SPACE 114A | EXECUTION SPACE INITIALIZATION PARAMETER 200A | TO-BE-STARTED PROGRAM LIST 220A |
|---|---|---|---|---|---|---|
| 0x0024 | 1000 MB | 10/100 | 0x10, 0x20, | 2 GB | Param_F | Prg_List_F |

| EXECUTION SPACE AUTHENTICATION ID (104A) | DEVICE 0x14 USABILITY (312) |
|---|---|
| 0x0014 | ○ |
| 0x0015 | × |
| 0x0020 | ○ |
| : | : |

| EXECUTION SPACE AUTHENTICATION ID (104A) | ADDITIONAL MEMORY AMOUNT (322) |
|---|---|
| 0x0014 | 100 MB |
| 0x0015 | 200 MB |
| 0x0020 | 50MB |
| : | : |

| EXECUTION SPACE AUTHENTI- CATION ID 104A | MAXIMUM MEMORY AMOUNT INCREMENT 332 | MAXIMUM CPU TIME INCREMENT 334 | ADDITIONAL AVAILABLE DEVICE ID 336 | MAXIMUM HARD DISK SPACE INCREMENT 338 |
|---|---|---|---|---|
| 0x0014 | -100 MB | +10/100 | + 0x30 | +1 GB |

| 224 | 342 | 344 | 230 |
|---|---|---|---|
| PROGRAM AUTHENTICATION ID | MAXIMUM MEMORY AMOUNT INCREMENT | ADDITIONAL AVAILABLE DEVICE ID | HARD DISK USABILITY |
| 0x0001 | +100 MB | + 0x30, | - |

340

METHOD AND APPARATUS FOR RESERVATION AND REALLOCATION OF SURPLUS RESOURCES TO PROCESSES IN AN EXECUTION SPACE BY A LOCAL RESOURCE MANAGER AFTER THE EXECUTION SPACE IS GENERATED SUCCEEDING THE INITIALIZATION OF AN APPLICATION FOR WHICH THE EXECUTION SPACE IS CREATED AND THE RESOURCES ARE ALLOCATED TO THE EXECUTION SPACE BY A GLOBAL RESOURCE MANAGER PRIOR TO APPLICATION EXECUTION

FIELD OF THE INVENTION

The present invention relates to information processing technology, and more particularly, to a method for processing information while dividing one information processing system into a plurality of partitions, and to an information processing apparatus adopting the method.

BACKGROUND TECHNOLOGY

Recently, a technology of multi-task systems is commonly used for executing a plurality of processes in one information processing apparatus. Information processing apparatuses, being able to provide in parallel a plurality of functions including receiving TV, executing a computer game, reproducing a moving image, sending and receiving email, or the like by one apparatus, are thus available widely and commonly. In a multi-task system, each process is divided and allocated to time slices of processor time and then executed sequentially, by which a plurality of processes are executed in parallel. Furthermore, a technology is also provided for controlling processes by partitioning a plurality of processes (e.g., for each application software corresponding to the process) and starting an operating system (hereinafter, referred to as an OS) for each partition. This allows one apparatus to manage a variety of software.

To execute a plurality of processes in parallel, not only CPU time but also resources of an information processing apparatus (e.g., a memory, an external storage, an I/O device or the like) are allocated for each process. An OS which controls the entire information processing apparatus allocates resources based on the status of process execution, a priority level relative to other processes, or the like.

Resources required by each process may change during the execution of the process. For example, when the amount of calculation required by a certain process increases, a delay may be caused with CPU time which is already allocated. In this case, the process requests additional allocation of CPU time from an OS which controls the entire information processing apparatus. The OS, which has received the request, coordinates with other processes and performs a certain processing, e.g., re-allocation of the CPU time.

However, overhead arises from: a) communication between processes and the OS with respect to additional allocation of resources; b) a processing queue maintained by the OS for processing allocation requests issued by a plurality of processes; or c) the like. The present inventors recognize that the overhead increases significantly as the number of processes to be executed in the information processing apparatus increases.

In this background, a general purpose of the present invention is to provide a technology to restrain overhead with respect to additional allocation of resources to processes.

SUMMARY OF THE INVENTION

According to one embodiment of the present invention, an information processing method is provided. The information processing method comprises: generating a plurality of execution spaces; allocating resources of an apparatus to the plurality of execution spaces; starting one or more processes in each of the execution spaces; and allocating resources, included in the resources allocated to the execution space, to the process started in the execution space.

The term "process" refers to software programmed to accomplish a certain goal or the content of information processing included in the software. A "process" may correspond with software, or with a unit which is smaller than software (e.g., input-output control, a command specified by a user or the like), as far as the unit corresponds to any unit of processing or functions. The term "execution space" refers to an environment wherein more than one process is executed. The "execution space" may be a process itself or may include an OS necessary for the execution of the process. It may also be, for example, a bundle of processes partitioned by a certain logical factor, (e.g., respective software, respective functions, respective OS's necessary for control, or the like). The respective "resources" may include a) quantitative or temporal scope of hardware which can be divided quantitatively or temporally, such as an amount of memory or CPU time; and/or b) hardware itself, such as a device connected to an apparatus. Therefore, the "allocation of resources" may include a case where a part of resources divided quantitatively or temporally is allocated and/or a case where access information for accessing hardware is given.

According to another embodiment of the present invention, an information processing apparatus is provided. The information processing apparatus in which a plurality of execution spaces are generated comprising: a first resource manager operable to manage resources of the entire information processing apparatus and allocating the resources to the plurality of execution spaces; and a second resource manager provided for each of the plurality of execution spaces and operable to manage resources, allocated by the first resource manager for the execution space to which the second resource manager belongs, and allocating resources to one or more processes executed in the execution space to which the second resource manager belongs.

Optional combinations of the aforementioned constituting elements, and implementations of the invention in the form of methods, apparatuses, systems, and computer programs may also be practiced as additional modes of the present invention.

According to the present invention, resources can be allocated to processes efficiently.

BRIEF DESCRIPTION OF THE DRAWINGS

FIG. 5 shows an exemplary structure of a system initialization parameter table according to the present embodiment.

FIG. 6 shows an exemplary structure of an execution space initialization parameter table according to the present embodiment.

FIG. 7 shows an exemplary structure of a to-be-started program list according to the present embodiment.

FIG. 8 shows an exemplary data structure of a program file according to the present embodiment.

FIG. 9 shows an exemplary structure of an execution space name table according to the present embodiment.

FIG. 10 shows an exemplary structure of a global resource management table according to the present embodiment.

FIG. 11 shows an exemplary structure of a local resource management table according to the present embodiment.

FIG. 12 shows an exemplary structure of a process resource management table according to the present embodiment.

FIG. 22 shows an exemplary structure of a hard disk space management table according to the present embodiment.

FIG. 26 shows an exemplary structure of an additionally-started execution space parameter table according to the present embodiment.

FIG. 27 shows an exemplary structure of an additional device information table according to the present embodiment.

FIG. 28 shows an exemplary structure of additional memory amount information table according to the present embodiment.

FIG. 29 shows an exemplary structure of a global resource change information table according to the present embodiment.

FIG. 30 shows an exemplary structure of a local resource change information table according to the present embodiment.

DESCRIPTION OF THE REFERENCE NUMERALS

Figure 1:
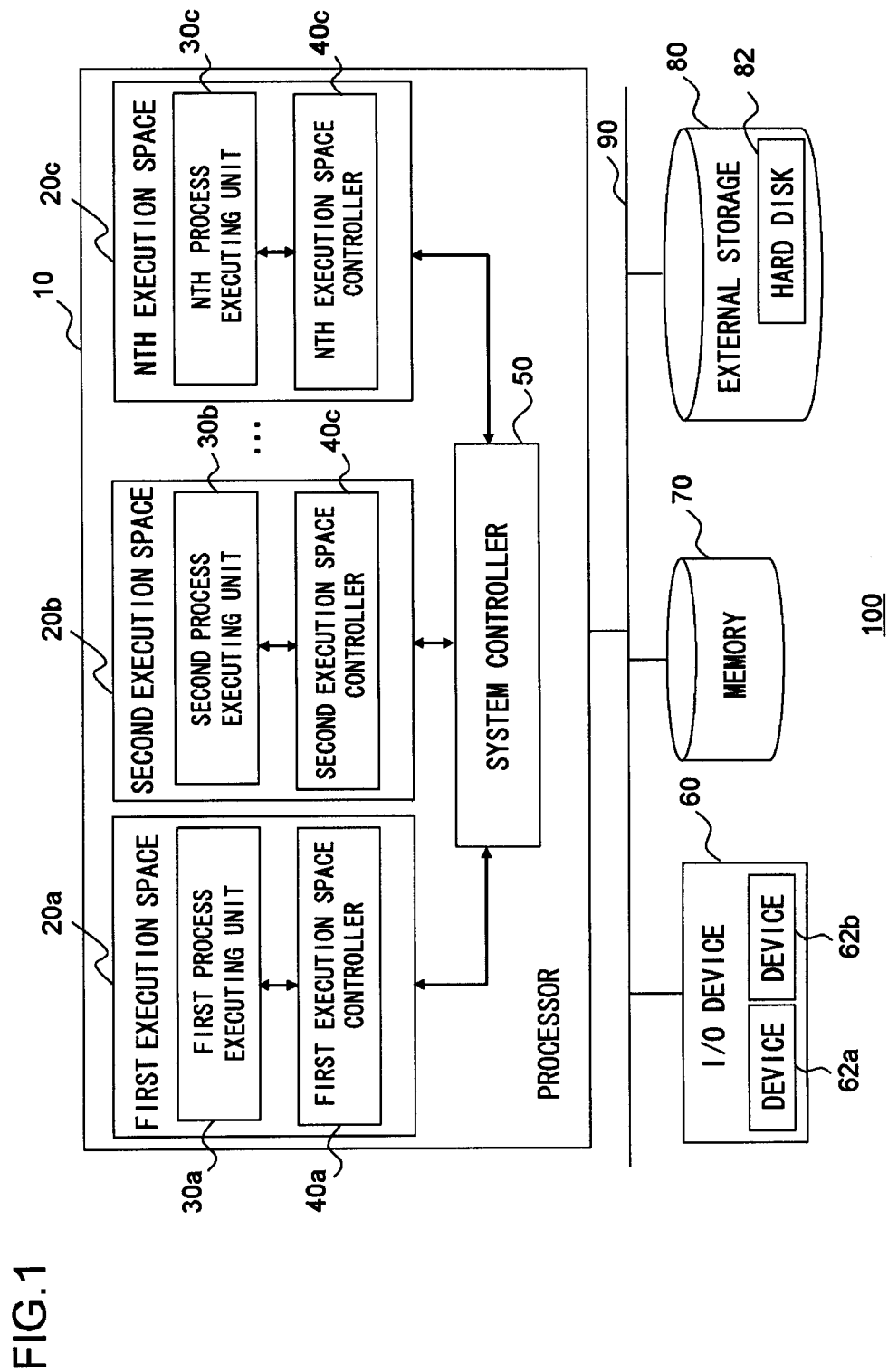
FIG. 1 is a block diagram showing the entire structure of an information processing apparatus according to the present embodiment.

10 . . . processor, 20 . . . execution space, 30 . . . process executing unit, 32 . . . process, 40 . . . execution space controller, 42 . . . local initializer, 44 . . . local name manager, 46 . . . local resource manager, 50 . . . system controller, 52 . . . global initializer, 54 . . . global name manager, 56 . . . global resource manager, 60 . . . I/O device, 62 . . . device, 70 . . . memory, 80 . . . external storage, 82 . . . hard disk, 100 . . . information processing apparatus, 102 . . . system initialization parameter, 104 . . . execution space authentication ID, 130 . . . execution space name table, 132 . . . execution space provisional ID, 140 . . . global resource management table, 150 . . . local resource management table, 160 . . . process resource management table, 170 . . . process name table, 172 . . . process ID

DETAILED DESCRIPTION OF THE INVENTION

Initially, the general outline of the present embodiment will be described below. The present embodiment is implemented in an information processing apparatus wherein one or more processes are executed in each of a plurality of execution spaces. Execution spaces are generated for respective software, e.g., a game, a web browser, a music compiler, or the like. Processes are generated as predefined units of processing for the execution of software. In case of the execution space for a game, the predefined units of processing are, e.g., image processing, audio processing or the like. To execute a plurality of processes in parallel, resources provided by the information processing apparatus (e.g., an amount of memory, CPU time or the like) are allocated to each process. According to the present embodiment, resources are initially allocated to respective execution spaces. Then, among the resources allocated to an execution space, resources are allocated to each process which belongs to the execution space.

According to the present embodiment, when a process requests the allocation of resources, it is firstly determined, in the execution space to which the process belongs, whether or not the resources can be allocated. Secondly, it is determined external to the execution space whether the resources can be allocated, as necessary. The second determination is made for each execution space. More specifically, the limitation on resource allocation is defined for each execution space in advance. Then the information about the limitation on resource allocation is referred to, based on the authentication ID defined uniquely for the execution space, by which whether or not the resources are allocated to the execution space is determined. The authentication ID and/or information about limitation on resource allocation, which are stored with programs as a part of software, should have been read out when the execution space corresponding to the software is generated.

If the resources are determined to be allocatable as the result of the second determination, the resources are allocated to the execution space. The resources are allocated to execution spaces in a unit of amount of resources, at a time. The unit is predefined for each execution space in advance. Resources once allocated to an execution space, are retained in the execution space even if some of the resources are in surplus. Consequently, when a process which belongs to the execution space requests resource allocation later, the problem concerning the processing of resource allocation is resolved through communications only within the execution space as far as the request is fulfilled by the resources retained in the execution space.

By determining hierarchically whether or not the resources are allocated, when an illegal process requests allocation of resources in an execution space, resources are allocated within the execution space initially. Thus, it is prevented that the allocation of resources affects the allocation of resources to other execution spaces. Even if an illegal process takes the place of a process which controls the execution space and requests the allocation of resources unrighteously, the limitation on the allocation determined for each execution space prevents excessive allocation. Consequently, the illegal process is prevented from occupying the resources of the apparatus and from influencing the progress of processes in other execution spaces. Hereinafter, "illegal process's taking place of another process and making a request or the like" is also referred to as "spoofing".

As described above, the resources retained in an execution space may resolve another request for resource allocation from a process. Therefore, overheads stemming from communication with the external to the execution space, a queue for allocation requests or the like can be restricted.

A specific explanation of the present embodiment will be given below. FIG. 1 shows the entire structure of an information processing apparatus 100 according to the present embodiment. The information processing apparatus 100 comprises a processor 10, an I/O device 60, a memory 70 and an external storage 80. The processor 10 processes a program of an application and/or an operating system. The I/O device 60 inputs an instruction from a user or outputs results of calculation. The memory 70 stores machine code or data temporarily. The external storage 80 stores a program of software or data. These elements transmit and receive data among each other via a bus 90. The I/O device 60 may include any of input apparatuses (e.g., a keyboard, a mouse, a game controller, a microphone, or the like) or output apparatuses (e.g., a printer, a display apparatus or the like), as devices 62a and 62b. The number of devices 62a and 62b is not limited to two. The external storage 80 may include any of non volatile storages which can retain the data regardless of whether the information processing apparatus 100 is powered on or off, for example, a hard disk 82, a flash memory (not shown) or the like.

The processor 10 includes n execution spaces 20, (execution space 20a, . . . , and execution space 20c) and a system controller 50 which controls the entire information processing apparatus 100 as a whole. The first execution space 20a includes a first process executing unit 30a and a first execution space controller 40a. The first process executing unit 30a executes one or more processes that belong to the first execution space 20a. The first execution space controller 40a controls the various kinds of functions in the first execution space 20a (e.g., the allocation of resources and/or the execution of processes), communication with functional blocks external to the first execution space 20a, and so on. In a similar fashion, other execution spaces (second execution space 20b, . . . , and nth execution space 20c) include a second process executing unit 30b, . . . , and a nth process executing unit 30c and a second execution space controller 40b, . . . , and a nth execution space controller 40c, respectively. Hereinafter, simply "20", "30" and "40" may also be used as reference numerals generic to the first to nth plurality of execution spaces, process executing units, and execution space controllers, respectively.

In FIG. 1, the execution space 20 is included in the processor 10 from a functional point of view. However, each execution space 20 and the system controller 50 may include the I/O device 60, the memory 70 or the external storage 80 in their scope as hardware. Other LSI's (not shown) may also be included as constituting elements. Functions of the execution space 20 and the system controller 50 may be implemented softwarewise by a program of an application, an OS or the like loaded into the memory 70. Therefore, it will be obvious to those skilled in the art that the functional blocks may be implemented by a variety of manners including hardware only, software only or a combination of both, and thus not limited to any particular manner. In FIG. 1 the processor 10 is shown as one rectangular to be easily understood. This does not limit the number of the processors 10 to one. For example, a configuration with a multiprocessor comprising a plurality of sub-processors or a configuration with a main-processor and a graphics processor may also be adopted. Further, the bus 90 may be configured to include buses exclusively used by respective hardware connected to the bus 90.

An execution space 20 is generated, e.g., when a user starts an application. For example, when detecting a request signal (e.g., an instruction input by a user through the I/O device 60 to start or the like), the system controller 50 reads OS code, a program, a parameter, or the like from the external storage 80 and loads them into the memory 70. Then the system controller 50 generates the execution space 20 by allocating resources necessary for the execution (e.g., CPU-time, amount of memory 70 to be used or the like). The execution space controller 40 allocates resources, allocated from the system controller 50, to the processes generated for the execution of an application. Accordingly, the process executing unit 30 executes each process within the allocated CPU time and, as necessary, accesses the memory 70 or the like.

When the process being executed needs an additional allocation of resources depending on the progress of the process, the process executing unit 30 requests the execution space controller 40 to allocate resources newly. The execution space controller 40 initially checks the resources retained in the execution space 20. If the request can be fulfilled with the retained resources, the execution space controller 40 allocates the retained resources to the process. If the retained resources are not sufficient, the execution space controller 40 requests the system controller 50 to allocate resources additionally. After a predefined validation procedure is performed, the system controller 50 allocates the resources to the execution space 20 additionally. The method for allocating resources will be described later.

Figure 2:
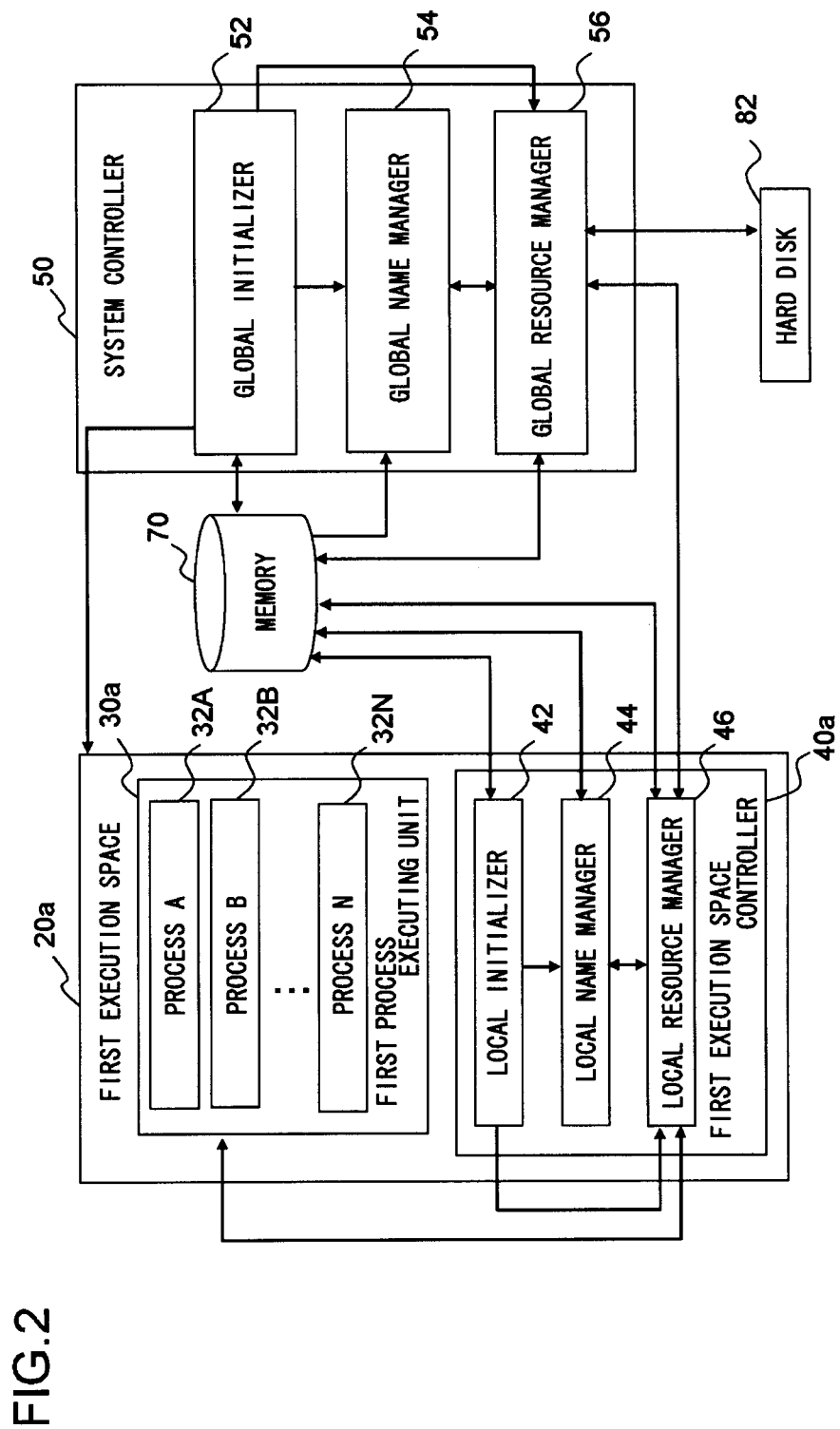
FIG. 2 is a block diagram showing the structures of a system controller and an execution space according to the present embodiment.

FIG. 2 shows the structure of the system controller 50 and the first execution space 20a in detail. The second execution space 20b, . . . , and the nth execution space 20c are not shown although configured in the same manner with the first execution space 20a. A Ath process 32A, a Bth process 32B, . . . , and a Nth process 32N processed by the first process executing unit 30a are, for example, processes for image processing, audio processing or the like which form one game. Hereinafter, just "32" may be used as a reference numeral for any of a plurality of processes (i.e., the first process, . . . , or the nth process). The first execution space controller 40a includes a local initializer 42, a local name manager 44 and a local resource manager 46. The local initializer 42 secures resources and initializes a to-be-started program in the first execution space 20a when the first execution space 20a is generated. The local name manager 44 resolves, when any of the processes 32 requests to allocate resources, the name of the process 32 issuing the request. The local resource manager 46 determines whether or not the allocation of resources to the process 32 is executed, executes subsequent processing accordingly and manages the resources of the entire first execution space 20a.

The system controller 50 includes a global initializer 52, a global name manager 54 and a global resource manager 56. The global initializer 52 performs processing of generating and initializing an execution space 20. The global name manager 54 resolves, when an execution space 20 requests to allocate resources, the name of the execution space 20 issuing the request. The global resource manager 56 determines whether or not the allocation of resources to the execution space 20 is executed, executes subsequent processing accordingly and manages resources of the entire information processing apparatus 100. Each functional block reads and/or writes data to and/or from the memory 70 and the hard disk 82, as necessary, according to procedures as will be described later.

Figure 3:
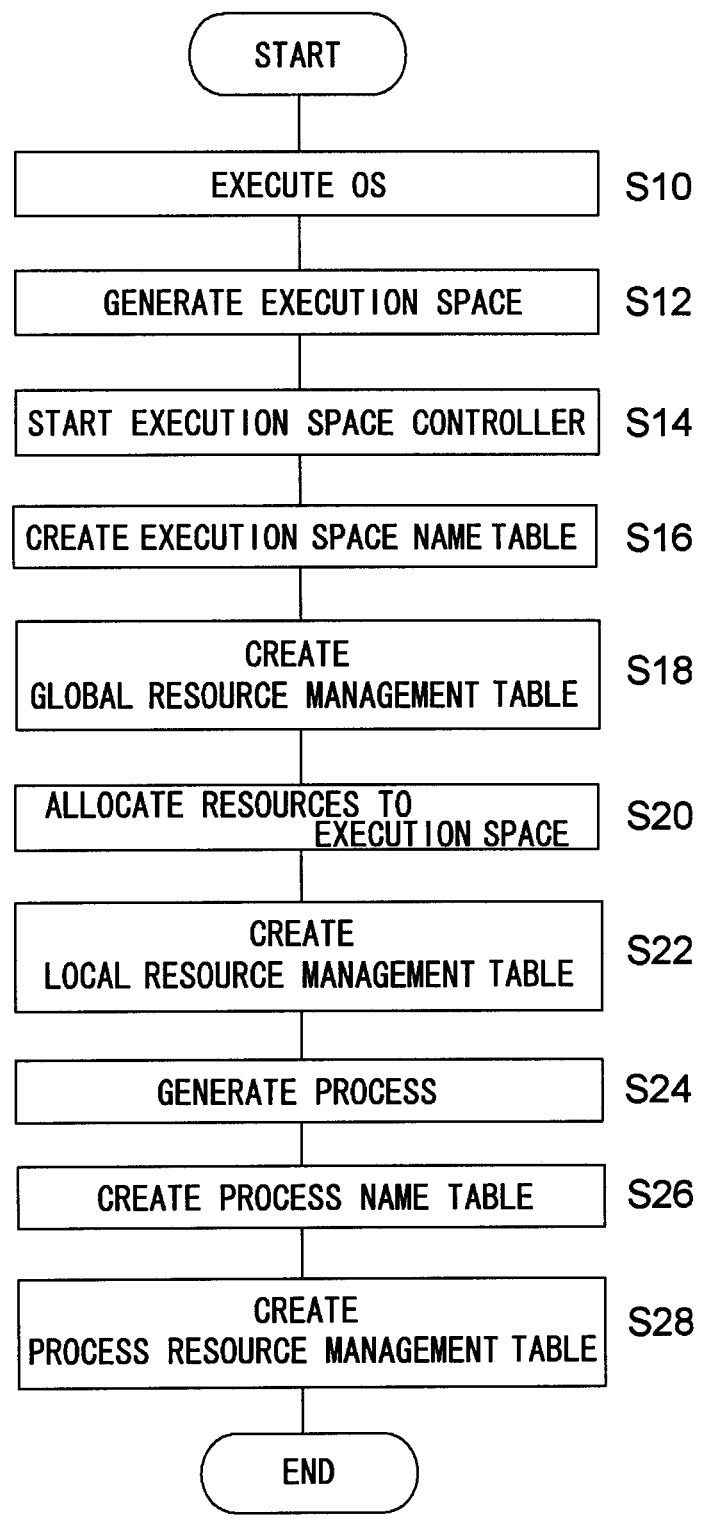
FIG. 3 is a flowchart showing a processing procedure when the information processing apparatus is started according to the present embodiment.

Next, an explanation of an operation with the configuration described above is given below. A variety of parameters or tables will be described in detail by way of specific examples later. FIG. 3 is a flowchart showing an operational flow when the information processing apparatus 100 is started. Initially, when a user inputs an instruction to start, the system controller 50 reads a program, a parameter or the like, necessary for starting, from the external storage 80 and loads them into the memory 70 and executes a predefined OS program (S10). In this step, validity of the read program or parameter are examined, e.g., by the authentication of an electronic signature or the like, as necessary. As a part of the execution of the OS program, the global initializer 52 in the system controller 50 generates a predefined number of execution spaces 20, based on a system initialization parameter included in the parameters read in S10, the system initialization parameter including information about the execution space 20 to be generated (S12). In this step, an execution space provisional ID is given to respective execution spaces 20 in the order of generation. The global initializer 52 further starts the execution space controller 40 including the local initializer 42, the local name manager 44 and the local resource manager 46 in each execution space 20 (S14). In this step, the global initializer 52 supplies an execution space initialization parameter and a to-be-started program list, indicating the programs to be started, to the local initializer 42. The execution space initialization parameter includes an initially-secured resource amount and a unit of amount of resources that can be secured additionally in the execution space 20. Information on the execution space initialization parameter and the program list to be started are included in the system initialization parameter read in step S10.

Subsequently, the global initializer 52 supplies the execution space provisional ID of the started execution space 20 and an execution space authentication ID, indicated in the system initialization parameter read in S10, to the global name manager 54 in the same system controller 50. The execution space authentication ID is a predefined fixed ID of software corresponding to the execution space 20. The global name manager 54 creates an execution space name table in which the execution space provisional ID's and the execution space authentication ID's of respective execution spaces 20 are associated with each other. Then the global name manager 54 stores the table into the memory 70 (S16). The global initializer 52 supplies information about the limitation on resource allocation, included in the system initialization parameter read in step S10, to the global resource manager 56. Based on the information, the global resource manager 56 creates a global resource management table for managing resources which are to be allocated to respective execution spaces 20 afterward. Then the global resource manager 56 stores the table into the memory 70 (S18).

The local initializer 42 in the execution space controller 40 started in step S14 supplies information about amounts of resources to be secured initially to the local resource manager 46, based on the execution space initialization parameters obtained from the global initializer 52. The local resource manager 46 performs procedures to secure the resources (S20). The details of the procedures will be described later. After the resources are secured, the local resource manager 46 creates a local resource management table which indicates: a) a unit of amount of resources which can be secured additionally, included in the execution space initialization parameter supplied from the local initializer 42, and b) the amount of resources secured in step S20. Then the local resource manager 46 stores the table into the memory 70 (S22).

The local initializer 42 further generates respective processes 32 by starting a program to be started based on the to-be-started program list obtained from the global initializer 52 in step S14 (S24). Concurrently, a process ID is supplied to each process 32 in the order of starting. Accordingly, the local initializer 42 supplies a process ID 32 and a program authentication ID of the started process to the local name manager 44. The program authentication ID is obtainable from the to-be-started program list. The program authentication ID is a predefined ID unique to each program, as with the execution space authentication ID. The local name manager 44 creates a process name table, which associates the process ID and the program authentication ID of each process 32 with each other, and stores the table into the memory 70 (S26). The local initializer 42 supplies information about the limitation on the resource allocation which can be obtained from the to-be-started program list to the local resource manager 46.

Based on the information, the local resource manager 46 creates a process resource management table for managing resources to be allocated to respective processes 32 afterwards, and stores the table into the memory 70 (S28). This is the end of the processing when the information processing apparatus 100 is started.

Figure 4:
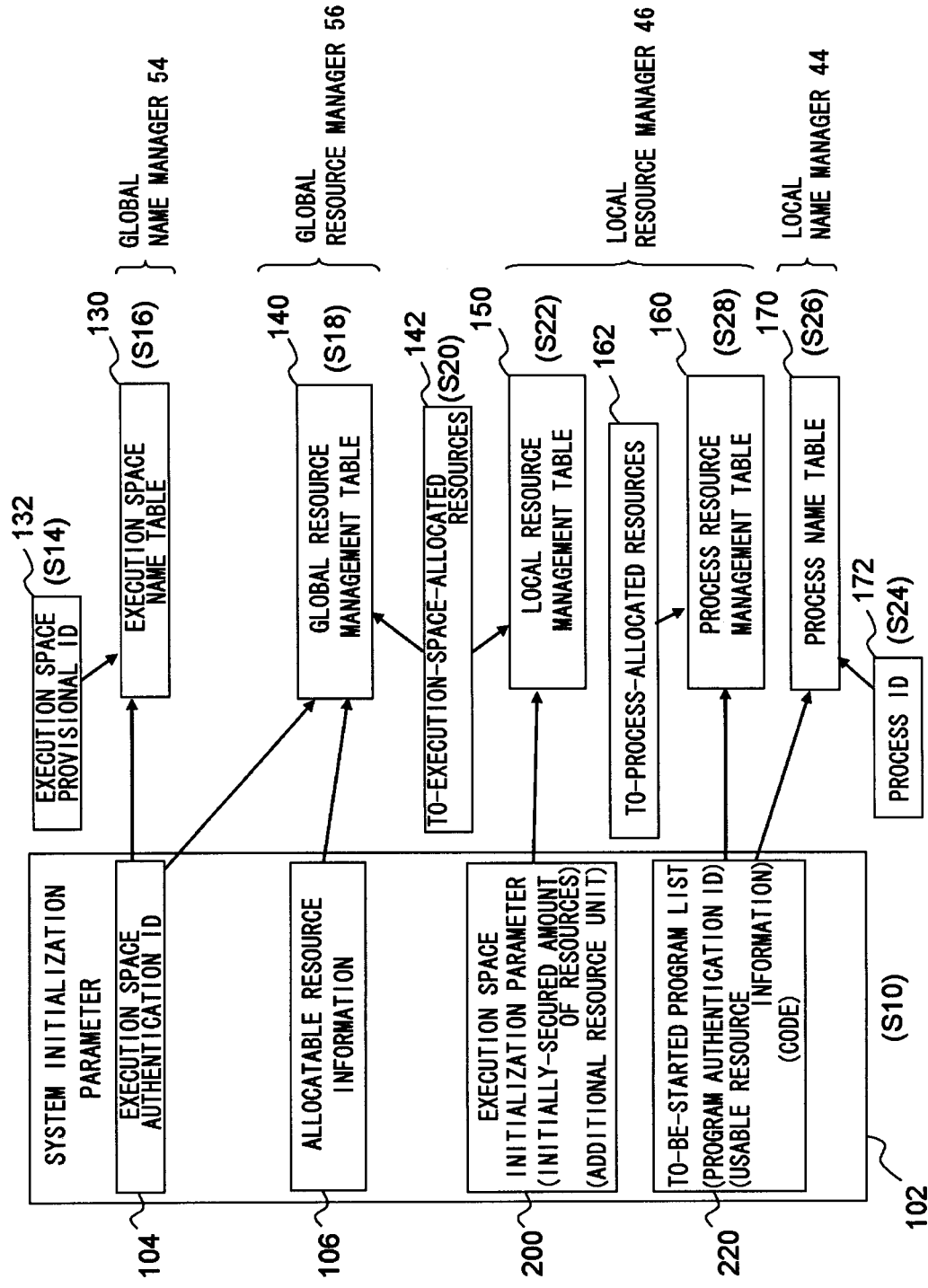
FIG. 4 is a schematic diagram showing the relation between parameters and tables with respect to processing of resource allocation in the information processing apparatus according to the present embodiment.

FIG. 4 is a diagram showing relations between the parameters obtained and tables created by the processing described above. Among the reference numerals for steps shown in the flowchart of FIG. 3, reference numerals for steps that correspond to the acquisition of parameters or the creation of tables in FIG. 4 are shown in parentheses. Among the functional blocks shown in FIG. 2, functional blocks that refer to respective created tables are shown in the right side of the figure. The system initialization parameter 102, which the system controller 50 reads in step S10 in FIG. 3, includes; a) a list of the execution space authentication ID's 104 of the execution spaces 20 to be generated, b) allocatable resource information 106 indicating an amount or a kind of resources allocatable to respective execution spaces 20, c) an execution space initialization parameter 200 including an amount of resources to be secured for the execution space 20 initially and a unit of amount of resources which can be secured additionally (hereinafter referred to as an "additional resource unit"), and d) a to-be-started program list 220 including a list of program authentication ID's of programs to be started in the execution space 20, an amount or a kind of resources which can be used by respective programs, and binary code of respective programs.

Each parameter value included in the system initialization parameter 102 is information attached to software from which each execution space 20 originated. The value stored, for example, in a CD-ROM (Compact Disc Read Only Memory) with programs, is read and loaded into the memory 70 as a table.

The execution space authentication ID's 104 are associated with the execution space provisional ID's 132, which are supplied to each execution space 20 in the order of generation in step S14 in FIG. 3, and constitutes a execution space name table 130 in step S16. The execution space name table 130 is referred to by the global name manager 54 and resolves the name of the execution space 20 that issues the request for the allocation of resources. The execution space authentication ID's 104 are further associated with: a) allocatable resource information 106 included in the system initialization parameter 102 and b) to-execution-space-allocated resources 142, which is information on resources actually allocated to the execution space 20 through a procedure that will be described later, and constitutes a global resource management table 140 in step S18 in FIG. 3. The global resource management table 140 is referred to by the global resource manager 56 in the system controller 50 and used when determining whether or not the resources requested by the execution space 20 can be allocated. The initial value of the to-execution-space-allocated resources 142 can be obtained in step S20 in FIG. 3 (i.e., the step for initial allocation of resources to the execution space 20). Then the value is updated every time the allocation of resources to the execution space 20 is altered.

The execution space initialization parameter 200 included in the system initialization parameter 102 is associated with the to-execution-space-allocated resources 142 described above and constitutes a local resource management table 150 which is referred to by the execution space controller 40 in step S22 in FIG. 3. The local resource management table 150 is referred to by the local resource manager 46 and used for determining whether or not to issue a request for resources to the system controller 50 and, in case the request is to be issued, for specifying the amount of resources to request.

The program authentication ID's, included in the to-be-started program list 220 in the system initialization parameter 102, are associated with: a) information on usable resources for the process 32 which executes respective programs included in the same to-be-started program list 220 and b) a to-process-allocated resource 162, and constitute a process resource management table 160 in step S28 of FIG. 3. The to-process-allocated resource 162 is information on resources actually allocated to respective processes 32 through the procedure that will be described later. The process resource management table 160 is also referred to by the local resource manager 46 and used for determining whether or not the resources requested by a process 32 can be allocated. The information on the to-process-allocated resource 162 is updated every time the allocation of resources to the processes 32 is altered. Further, the program authentication ID's are associated with process ID's 172 and constitute a process name table 170 in step S26 in FIG. 3. The process ID 172 is supplied, when the corresponding process 32 is started in step S24 in FIG. 3, in the started order. The process name table 170 is referred to by the local name manager 44 and resolves the name of a process 32 that issues the request for the allocation of resources.

An exemplary structure of each table will now be presented specifically. FIG. 5 shows an exemplary structure of a table describing the system initialization parameter 102. The system initialization parameter table 102A contains an execution space authentication ID field 104A, a maximum memory amount field 108A, a maximum CPU time field 110A, an available device ID field 112A, a maximum hard disk space field 114A, an execution space initialization parameter field 200A and a to-be-started program list field 220A.

The execution space authentication ID's 104 for each execution space 20, the ID's shown in FIG. 4, are described in the execution space authentication ID field 104A. As described above, the execution space authentication ID 104 is a fixed ID, attached to software from which the execution space 20 originates, and determined uniquely for each software or the like. Maximum amounts of memory that can be allocated to respective execution spaces 20 are described in the maximum memory amount field 108A. Maximum CPU time that can be allocated to respective execution spaces 20 is described in the maximum CPU time field 110A. ID's of devices 62 which is available for respective execution spaces 20 are described in the available device ID field 112A. The maximum hard disk space that can be allocated to the execution spaces 20 is described in the maximum hard disk space field 114A. These parameters are included in the allocatable resource information 106 shown in FIG. 4.

Optimum values for the maximum amount of memory, the maximum CPU time and the maximum hard disk space are obtained, for example, by a verification experiment at the software development stage. The device ID is a fixed ID determined uniquely for each device 62. Available devices 62 are also determined at the software development stage based on the contents of software, or the like. For example, in case of an execution space 20 that executes a car racing game, the available devices 62 are determined to be a controller with direction-indicating buttons and a controller shaped like a steering wheel. In the example of FIG. 5, the hard disk 82 represents the external storage 80. However, the external storage 80 is not limited to the hard disk 82 as far as the external storage 80 can be accessed by an execution space 20, e.g., a flash memory (not shown). Hereinafter, explanations are given in reference to the example with the hard disk 82.

The execution space initialization parameter 200 shown in FIG. 4 (i.e., the name of a file in which the initially-secured resource amount and the additional resource unit are stored) is described in the execution space initialization parameter field 200A. Alternatively, the initially-secured resource amount and the additional resource unit can be described in the field directly. FIG. 6 shows an exemplary structure of a table stored in the file described in the execution space initialization parameter field 200A (e.g., a file "Param_A"). The execution space initialization parameter table 200B includes an initially-secured memory amount field 202, an additionally-secured memory amount unit field 204, an initially-secured CPU time field 206 and an additionally-secured CPU time unit field 208. An initially-secured memory amount and initially-secured CPU time described in the initially-secured memory amount field 202 and the initially-secured CPU time field 206, respectively, are an amount of memory and CPU time to be secured initially for an execution space 20, when the execution space 20 is generated. The processing of the initial securement corresponds to step S20 in the procedure shown in FIG. 3, performed when the information processing apparatus 100 is started. The additionally-secured memory amount unit and the additionally-secured CPU time unit described in the additionally-secured memory amount unit field 204 and the additionally-secured CPU time unit field 208 respectively, are referred to in a procedure for additional allocation of an amount of memory or CPU time. The additional amount of memory and CPU time are, as will be described later, allocated to an execution space 20 in unit of a positive integral multiple of the additionally-secured memory amount unit or the additionally-secured CPU time unit. An optimum values for the values described in the execution space initialization parameter table 200B are also obtained by a verification experiment at the software development stage or the like.

Referring back to FIG. 5, names of files, which store the to-be-started program list 220 shown in FIG. 4, are described in the to-be-started program list field 220A in the system initialization parameter table 102A. Alternatively, the to-be-started program list 220 may be described in the field directly. FIG. 7 shows an exemplary structure of the list stored in the file (e.g., file "Prg_List_A") described in the to-be-started program list field 220A. The to-be-started program list 220 includes a program file name field 222 wherein the file name of a program file which stores information on programs constituting certain software from which the execution space 20 is originated.

FIG. 8 shows an exemplary data structure of the program file (e.g., file "prg1") described in the program file name field 222. The program information table 222A includes a program authentication ID field 224, a maximum memory amount field 226, an available device ID field 228, a hard disk usability field 230 and a code field 232. In the program authentication ID field 224, a program authentication ID, which is a fixed ID determined uniquely for each program, is described. In the maximum memory amount field 226, a maximum amount of memory that can be allocated to a process 32 corresponding to the program is described. In the available device ID field 228, an ID of a device 62 that is available for the process 32 is described. These parameters correspond to a part of the maximum amount of memory and the available devices, defined for each execution space 20 in the system initialization parameter table 102A, the maximum amount of memory and the available devices being separated into respective programs processed. The parameters are determined at the software development stage. In the hard disk usability field 230, a character string or the like which distinguishes whether or not the process 32, corresponding to the program, can use the hard disk 82 is described. Whether or not the hard disk 82 can be used is determined at the software development stage, depending on the contents of the program or the like. In the code field 232, binarized code is described as a program body.

The maximum CPU time allocatable to a process 32 can be defined by using a function for controlling the allocation of CPU time, the function being generally provided by an OS. Thus, a field for the maximum CPU time is not added in the program information table 222A in FIG. 8. However, the field for the maximum CPU time may be further added and may be managed by the global resource manager 56 in the present embodiment.

FIG. 9 shows an exemplary structure of the execution space name table 130 generated in step S16 in FIG. 3. The execution space name table 130 includes an execution space provisional ID field 132A and an execution space authentication ID field 104A. The execution space provisional ID's 132 described in the execution space provisional ID field 132A are supplied sequentially when respective execution spaces 20 are generated in step S12 in FIG. 3. The execution space authentication ID's 104, described in the execution space authentication ID field 104A, correspond to the values described in the execution space authentication ID field 104A in the system initialization parameter table 102A shown in FIG. 4. The global name manager 54 associates these ID's and generates the execution space name table 130.

FIG. 10 shows an exemplary structure of a global resource management table 140 generated in step S18 in FIG. 3. The global resource management table 140 includes an execution space authentication ID field 104A, a maximum memory amount field 108A, an actually-allocated memory amount field 144, a maximum CPU time field 110A, an actually-allocated CPU time field 146, an available device ID field 112A and a maximum hard disk space field 114A. The execution space authentication ID 104 described in the execution space authentication ID field 104A is the execution space authentication ID 104 described in the execution space authentication ID field 104A in the system initialization parameter table 102A shown in FIG. 4. In a similar fashion, the values described in the maximum memory amount field 108A, the maximum CPU time field 110A, the available device ID field 112A and the maximum hard disk space field 114A are the values described in the maximum memory amount field 108A, the maximum CPU time field 110A, the available device ID field 112A and the maximum hard disk space field 114A in the system initialization parameter table 102A, respectively. In the actually-allocated memory amount field 144 and the actually-allocated CPU time field 146: a) the initial values for the amount of memory and the CPU time allocated to each execution space 20 in step S20 in FIG. 3, respectively; or b) in case that additional allocation is performed as will be described later, the values after the additional allocation; are described.

FIG. 11 shows an exemplary structure of the local resource management table 150 generated in step S22 in FIG. 3. The local resource management table 150 includes an actually-secured memory amount field 154, an additionally-secured memory amount unit field 204, an actually-secured CPU time field 156 and an additionally-secured CPU time unit field 208. The values described in the additionally-secured memory amount unit field 204 and the additionally-secured CPU time unit field 208 are the values defined in the additionally-secured memory amount unit field 204 and the additionally-secured CPU time unit field 208 in the execution space initialization parameter table 200B, respectively. In the actually-secured memory amount field 154 and the actually-secured CPU time field 156: a) the initial values for the amount of memory and CPU time secured by each execution space 20 in step S20 in FIG. 3, respectively; or b) in case that additional allocation is performed as will be described later, the values after the allocation; are described. These values correspond to the values described in the actually-allocated memory amount field 144 and the actually-allocated CPU time field 146 in the global resource management table 140, respectively.

FIG. 12 shows an exemplary structure of a process resource management table 160 generated in step S28 in FIG. 3. The process resource management table 160 includes a program authentication ID field 224, an actually-allocated memory amount field 164, a maximum memory amount field 226, an actually-allocated CPU time field 166, an available device ID field 228 and a hard disk usability field 230. The program authentication ID described in the program authentication ID field 224 corresponds to the program authentication ID described in the program authentication ID field 224 in the program information table 222A shown in FIG. 8. In a similar fashion, the values described in the maximum memory amount field 226, the available device ID field 228 and the hard disk usability field 230 are the values defined in the maximum memory amount field 226, the usable device ID field 228 and the hard disk usability field 230 in the program information table 222A, respectively. The mark "−" if in the available device ID field 228 indicates that there is no available device. The mark "−" in the hard disk usability field 230 indicates that the hard disk 82 is unusable. The values for the actually-allocated memory amount field 164 and the actually-allocated CPU time field 166 are the values after an allocation occurring when the amount of memory and the CPU time are allocated to each process 32 in the execution space 20 through a procedure which will be described later.

The process resource management table 160 may include parameters necessary for resource management other than parameters described above (e.g., the physical address of the memory 70 allocated to each process 32). However, the explanation is omitted here.

Figures 13, 14:
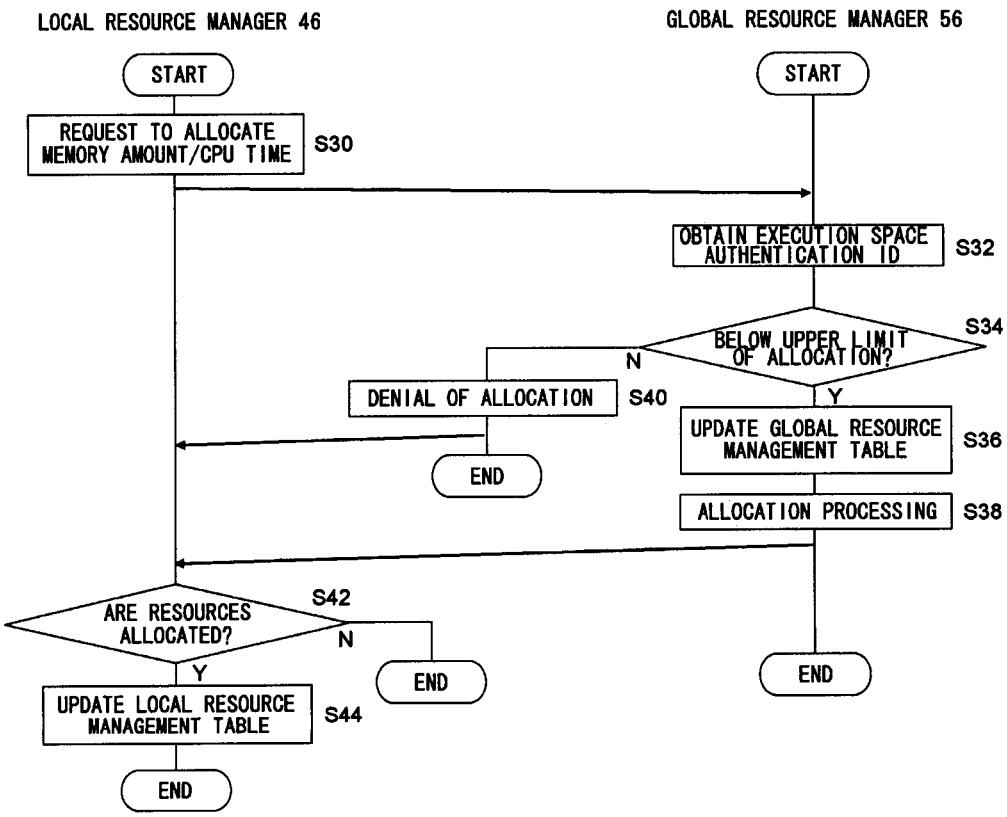
FIG. 13 shows an exemplary structure of a process name table according to the present embodiment.
FIG. 14 is a flowchart showing procedures for allocating an amount of memory or CPU time to an execution space according to the present embodiment.

FIG. 13 shows an exemplary structure of the process name table 170 generated in step S26 in FIG. 3. The process name table 170 includes a process ID field 172A and a program authentication ID field 224. The process ID 172 described in the process ID field 172A is supplied sequentially when each process 32 is generated in step S24 in FIG. 3. The program authentication ID described in the program authentication ID field 224 is the program authentication ID described in the program authentication ID field 224 in the program information table 222A shown in FIG. 8. By associating these values, the local name manager 44 generates the process name table 170.

An explanation of procedures for allocating resources to an execution space 20 initially in step S20 in FIG. 3 is given below. FIG. 14 is a flowchart showing procedures for allocating an amount of memory or CPU time to the execution space 20. The procedure is performed not only at the time of the initial allocation when the information processing apparatus 100 is started, but also when an additional resource is required to execute a process which belongs to the execution space 20. Initially, the local resource manager 46 requests the global resource manager 56 to allocate an amount of memory or CPU time (S30). The request includes values of memory amount or CPU time included in the amounts of resources to be secured initially for the execution space 20, defined in the execution space initialization parameter 200. The local resource manager 46 may further request to allocate devices or hard disk space, when the information processing apparatus 100 is started, by adding a field for devices to be secured initially and/or a field for hard disk space to be secured initially in the execution space initialization parameter table 200B shown in FIG. 6. Hereinafter, an explanation will be given of the request for an amount of memory or CPU time.

The system controller 50 plays a role as an OS in the information processing apparatus 100. The system controller 50 also provides a function for switching executions among a plurality of execution space 20a, . . . , and 20c. The local resource manager 46 calls for a communication function provided by the system controller 50 when the local resource manager 46 communicates the request for allocation to the global resource manager 56. Thus, the system controller 50 can identify the execution space 20 that has called for the communication function. As a result, the global resource manager 56 can identify the execution space provisional ID 132 of the execution space 20 which has issued the request for allocation in step S30. The global resource manager 56 makes an inquiry to the global name manager 54 based on the execution space provisional ID 132 and obtains the execution space authentication ID 104 of the execution space 20 which has issued the request (S32).

Subsequently, the global resource manager 56 refers to the global resource management table 140 based on the execution space authentication ID 104 and checks whether or not the total amount of memory or CPU time allocated after the allocation of requested amount of memory or CPU time exceed the upper limit on allocation of the amount of memory or CPU time for the execution space 20 issuing the request (S34). If it does not exceed the upper limit on allocation (Y in S34), values for the actually-allocated memory amount and/or the actually-allocated CPU time in the global resource management table 140 are updated to values after the allocation (S36). Then processing of the allocation is executed (e.g., updating a schedule, securing an address or the like) and a permit is issued to the local resource manager 46 (S38). If the total amount exceeds the upper limit for allocation (N in S34), an error is returned as a denial of allocation to the local resource manager 46 (S40) and the procedure completes. Although when allocating the resources initially in step S20 in FIG. 3, the flow always proceeds to "Y" at step S34, when allocating the resources additionally, the flow branches to "Y" and "N".

In response to the request for allocation in step S30, the local resource manager 46 checks whether the amount of memory and/or CPU time is allocated or an error is returned (S42). If the resources are allocated (Y in S42), the values for the actually-secured memory amount or the actually-secured CPU time in the local resource management table 150 are updated to the values after the allocation (S44) and the procedure ends accordingly. If an error is returned (N in S42), the procedure ends directly.

When an additional resource is needed to execute a process which belongs to the execution space 20, the process 32 requests the local resource manager 46 to allocate an amount of memory or CPU time, as a previous step of the procedures shown in FIG. 14. If the request is satisfied by the reserved amount of memory or the CPU time in the execution space 20, the procedure shown in FIG. 14 does not have to be followed.

Figure 15:
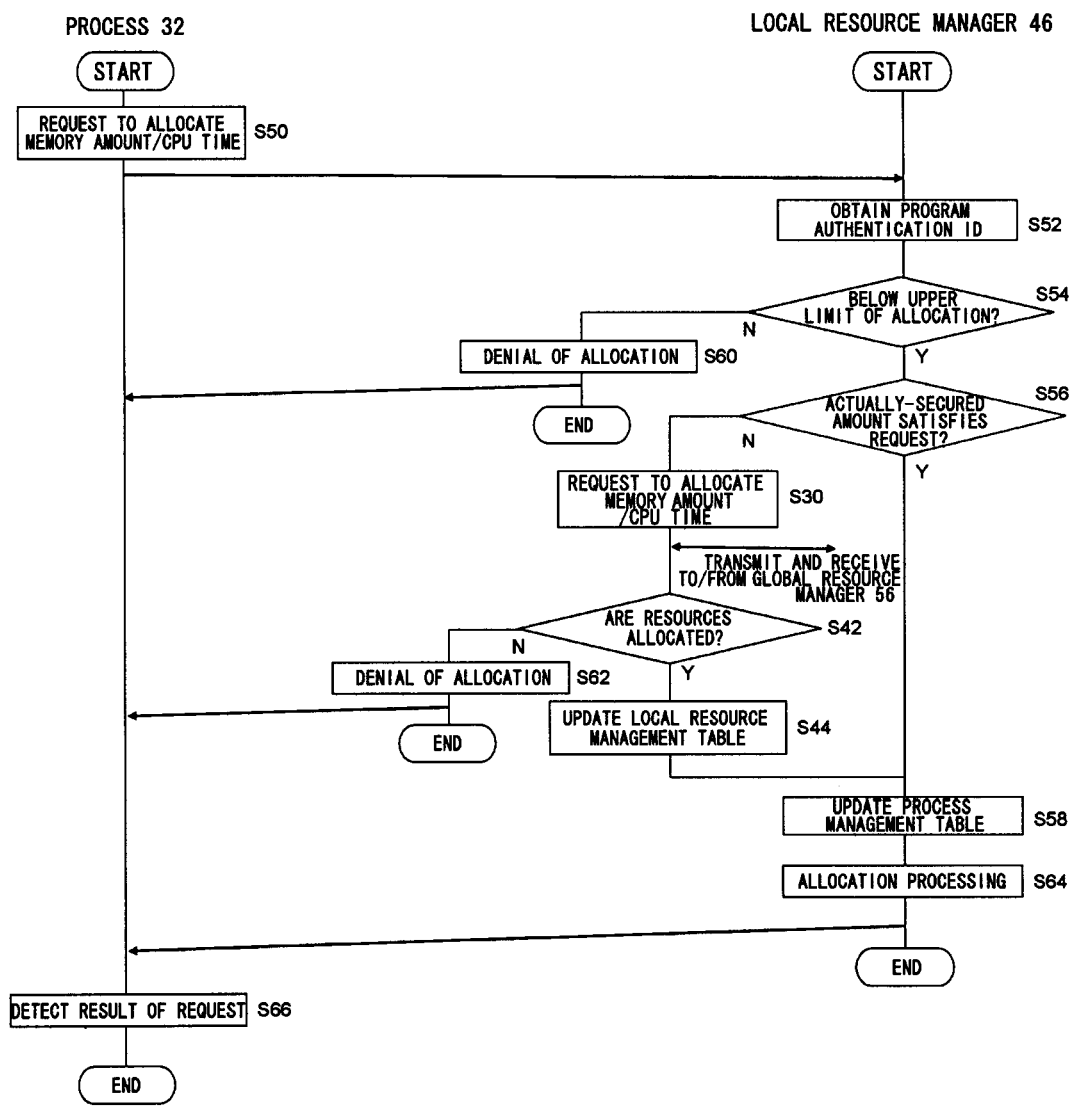
FIG. 15 is a flowchart showing procedures for allocating an amount of memory or CPU time to a process according to the present embodiment.

FIG. 15 is a flowchart showing procedures for allocating an amount of memory or CPU time to the process 32 as described above. When the process 32 itself is generated or when the amount of memory or the CPU time secured for the process 32 are insufficient for the demand, the process 32 firstly request the local resource manager 46 which belongs to the same execution space 20 to allocate an amount of memory or CPU time (S50). The request includes a necessary amount of memory and/or CPU time. The local resource manager 46 receives the request for allocation issued from the process 32 that is processed in the execution space 20 to which the local resource manager 46 belongs. The execution space controller 40 including the local resource manager 46 plays a role as an OS for the execution space 20. The execution space controller 40 also provides a function for switching executions among a plurality of processes 32A, . . . , and 32N. The process 32 calls for a communication function provided by the execution space controller 40 when the process 32 communicates the request for allocation to the local resource manager 46. Thus, the execution space controller 40 can identify the process 32 which has called for the communication function. As a result, the local resource manager 46 can identify the process ID 172 of the process 32 which has issued the request for allocation in step S50. The local resource manager 46 makes an inquiry to the local name manager 44 based on the process ID 172 and obtains the program authentication ID of the process 32 issuing the request (S52).

Subsequently, the local resource manager 46 refers to the process resource management table 160 based on the program authentication ID and checks whether or not the total amount of memory or CPU time allocated after the allocation of requested amount of memory or CPU time exceeds the upper limit on allocation of the amount of memory or CPU time for the process 32 issuing the request (S54). If it exceeds the upper limit on allocation (N in S54), the local resource manager 46 returns an error to the process 32 as a denial of allocation (S60). If the total amount does not exceed the upper limit for allocation (Y in S54), the local resource manager 46 subsequently refers to the local resource management table

150 and checks whether the requested amount of allocation is satisfied by the actually-secured memory amount or the actually-secured CPU time in the execution space 20 (S56).

If the actually-secured memory amount or the actually-secured CPU time is insufficient for the request (N in S56), the local resource manager 46 requests the global resource manager 56 to allocate an amount of memory or CPU time (S30). This procedure is performed in a similar manner as in step S30 in FIG. 14. However, the requested values of the amount of memory or CPU time included in the request is equal to or more than those requested by the process 32 and the positive integral multiple of the additionally-secured memory amount unit or the additionally-secured CPU time unit described in the local resource management table. The subsequent processing procedure in the global resource manager 56 is performed in a similar manner as in the steps from S32 to S40 in FIG. 14.

The local resource manager 46 checks whether an amount of memory or CPU time is allocated newly from the global resource manager 56 (S42). If allocated (Y in S42), the value in the actually-secured memory amount field 154 or the actually-secured CPU time field 156 in the local resource management table 150 is updated (S44). If not allocated newly (N in S42), an error is returned to the process 32 as a denial of allocation (S62).

If the actually-secured memory amount or the actually-secured CPU time for the execution space 20 satisfies the request (Y in S56), or if the request for allocation is issued to the global resource manager 56 and an amount of memory or CPU time is secured newly for the execution space 20 (Y in S42), the local resource manager 46 allocates exactly the amount of memory or CPU time, required by the process 32 in step S50, to the process 32. More specifically, the actually-allocated memory amount field 164 or the actually-allocated CPU time field 166 which correspond to the process 32 issuing the request in the process resource management table 160 is updated (S58). Then the processing of allocation is performed, for example, a notification of permission for allocation is transmitted to the process 32 (S64). When the process 32 detects that the request is permitted or not permitted (S66), the present processing of allocation ends. In steps S64 and S66 with respect to the notification of permission to the process 32, appropriate processing (e.g., a notification of a memory address or updating of a schedule) may be performed in practice.

As described in FIG. 14 and FIG. 15, an amount of memory or CPU time is allocated to an execution space 20 in a predefined amount to be secured initially or in a predefined additional resource unit at a time, according to the present embodiment. Therefore, the amount of memory or CPU time allocated to the execution space 20 exceeds the value required by a process 32 issuing the request. Resultant surplus resources are secured in the execution space 20, unused. Next time a process 32 in the execution space 20 needs more amount of memory or CPU time, it is checked whether or not the allocation can be made with the amount of memory or CPU time reserved in the execution space 20. If it is possible, the allocation can be completed through processing in the execution space 20 alone. Thus, the number of communications with elements external to the execution space 20 decreases and the load of response to requests of allocation can be distributed. As a result, overhead with respect to processing of allocation can be reduced.

Figure 18:
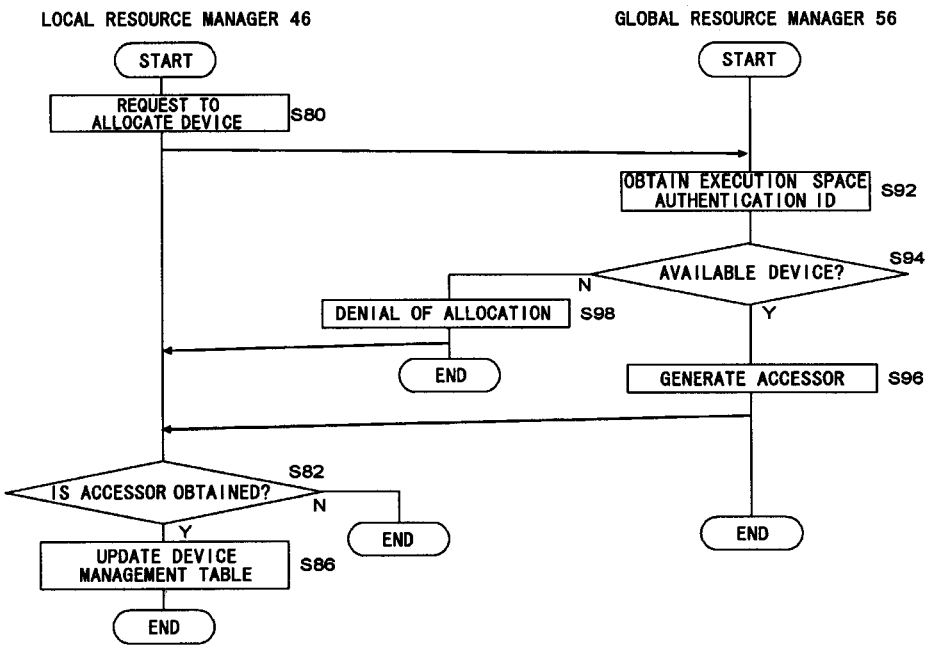
FIG. 18 is a flowchart showing procedures for allocating a device to an execution space according to the present embodiment.

Next, an explanation of the procedures for allocating a device 62 included in the resources in the information processing apparatus 100 is given below. The device 62 is not described in the execution space initialization parameter table 200B shown in FIG. 6. In this case, when the information processing apparatus 100 is started, only an amount of memory and CPU time are allocated to the execution space 20 and a process 32 is generated. The device 62 is to be allocated to the execution space 20 on request from each process 32, afterward. Alternatively, the execution space initialization parameter table 200B may include the device ID of the device 62 that should be secured initially by the execution space 20 when started, by which the device 62 is also allocated to the execution space 20 before the generation of a process 32. In this case, the request for allocation from the local resource manager 46 to the global resource manager 56 shown in FIG. 18 is issued initially, among the procedures for allocating the device 62 described below. In the following explanation, the request for allocation from the process 32 to the local resource manager 46, and the request for allocation from the local resource manager 46 to the global resource manager 56 are performed in this order.

Figures 16, 17:
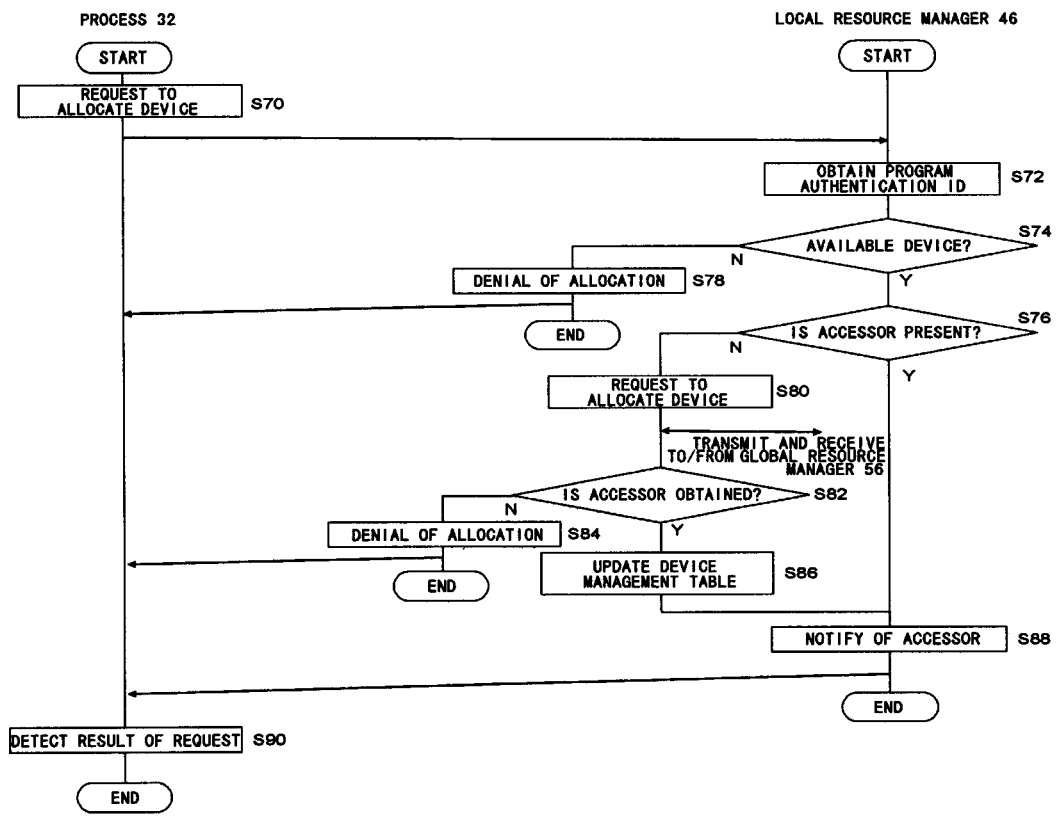
FIG. 16 is a flowchart showing procedures for allocating a device to a process according to the present embodiment.
FIG. 17 shows an exemplary structure of a device management table according to the present embodiment.

FIG. 16 is a flowchart showing procedures for allocating a device 62 to a process 32. This procedure is performed in case the device 62 is allocated when the process 32 is generated or in case the access to the device 62 is required in the middle of processing. The process 32 firstly requests the local resource manager 46, which belongs to the same execution space 20, to allocate the device 62 (S70). The request includes the device ID of the necessary device 62. The local resource manager 46 receives the request for allocation issued from the process 32 executed in the execution space 20 to which the local resource manager 46 belongs. By the communication transmitting and receiving the request, the process ID 172 of the process 32 issuing the request is identified. The local resource manager 46 makes an inquiry to the local name manager 44 based on the process ID 172 and obtains the program authentication ID of the process 32 issuing the request (S72). Subsequently, the local resource manager 46 refers to the process resource management table 160 based on the program authentication ID and checks whether the device ID of the requested device 62 is included in the available device ID field 228 of the process 32 issuing the request (S74). If not included (N in S74), an error is returned to the process 32 as a denial of allocation (S78).

If the device ID of the requested device is included in the available device ID field 228 (Y in S74), the local resource manager 46 subsequently refers to the device management table and checks whether the accessor of the requested device 62 is present (S76). The device management table is a table which associates: a) the device ID of the device 62 previously allocated to the execution space 20; and b) the accessor obtained at the time of the allocation; with each other. The term "accessor" refers to a set of parameters and data necessary to access the device 62, for example, a communication handler dedicated to manipulation of the device. According to the present embodiment, by allowing the execution space 20 to secure the accessor of the device 62 once obtained, the accessor is re-used next time a process 32 in the same execution space 20 requires the same device 62. An exemplary structure of the device management table will be described later.

If the device ID of the requested device 62 is not present in the device management table (N in S76), it is interpreted that the access to the device 62 has not been established in the past. Then the local resource manager 46 requests the global resource manager 56 to allocate the device 62 (S80). The global resource manager 56 receives the request and, if the allocation to the execution space 20 issuing the request is possible, returns the accessor to the local resource manager 46. If the allocation is not possible, the global resource manager 56 returns an error. The procedures for requesting the global resource manager 56 to allocate devices will be explained in detail in FIG. 18. On obtaining the accessor from the global resource manager 56 (Y in S82), the local resource manager 46 updates the device management table, associating the device ID and the obtained accessor with each other (S86). If the accessor can not be obtained (N in S82), an error is returned to the process 32 as a denial of allocation of the device 62 (S84).

If the accessor of the device 62 requested by the process 32 has been obtained beforehand (Y in S76), or an accessor is obtained newly for the execution space 20, by issuing a request to the global resource manager 56 (Y in S82), the local resource manager 46 notifies the process 32 of the accessor (S88). Then the process 32 detects that the allocation of the device is permitted or not permitted (S90). The series of processing ends, accordingly. The process 32, supplied the permission for the allocation, accesses the device 62 based on the obtained accessor whenever necessary.

FIG. 17 shows an exemplary structure of a device management table, which is referred to in step S76 and updated in step S86 in FIG. 16. The device management table 250 includes a device ID field 252 and an accessor field 254. When the device 62 is allocated to the execution space 20, the device ID of the device 62 is described in the device ID field 252 and the obtained accessor is described in the accessor field 254. Thus, if the device ID of the device 62 requested by the process 32 is present in the device ID field 252, it is understood that the device 62 has been already allocated to the execution space 20. The device management table 250, with the local resource management table 150 or the like, is managed by the local resource manager 46 and is stored in the memory 70 or the like.

Next, the procedures for allowing the local resource manager 46 to secure the allocation of devices shown in steps S80-S86 in FIG. 16 are described in detail below. FIG. 18 is a flowchart showing procedures for allocating the device 62 to the execution space 20. Initially, the local resource manager 46 requests the global resource manager 56 to allocate the device 62 (S80). This step corresponds to the step S80 in FIG. 16. The request includes the device ID of the required device 62. By the communication transmitting and receiving the request, the execution space provisional ID 132 of the execution space 20 issuing the request is identified. The global resource manager 56 makes an inquiry to the global name manager 54, based on the execution space provisional ID 132 and obtains the execution space authentication ID 104 of the execution space 20 issuing the request (S92). Subsequently, the global resource manager 56 refers to the global resource management table 140 based on the execution space authentication ID 104 and checks whether the device ID of the requested device 62 is included in the available device ID field 112A of the execution space 20 issuing the request (S94). If included (Y in S94), an accessor for accessing the device 62 is generated and supplied to the local resource manager 46 (S96). If not included, an error is returned to the local resource manager 46 as a denial of allocation (S98).

If the local resource manager 46 can obtain the accessor from the global resource manager 56 (Y in S82), the local resource manager 46 updates the device management table 250 (S86) and the procedure ends. If the accessor can not be obtained (N in S82), the procedure ends directly. Thus the processing for the allocation of the device to the execution space 20 completes. The step S82 and the step S86 in FIG. 18 correspond to the step S82 and the step S86 in FIG. 16, respectively. Since FIG. 18 shows the procedure for requesting the allocation of the device from the local resource manager 46 to the global resource manager 56, the step next to N in S82 and the step next to the step S86 is set to "end". However, if the request for allocation of the device has been made from the process 32 as a previous step of this procedure, the processing of communicating the result to the process 32 follows as shown in FIG. 16.

According to the present embodiment, the accessor for the device 62, with which the access is once established, is reserved inside the execution space 20 as shown in FIG. 16 and FIG. 18. Then, next time a process 32 in the same execution space 20 requests to access the device 62, it is checked initially in the execution space 20 whether an access to the device 62 has been established previously. If established, the allocation can be completed only by processing inside the execution space 20. Thus, in a similar manner as the case with an amount of memory or CPU time, the number of communications with elements external to the execution space 20 decreases and the load of response to the request for allocation can be distributed. As a result, overhead with respect to the processing of allocation can be reduced.

Figure 21:
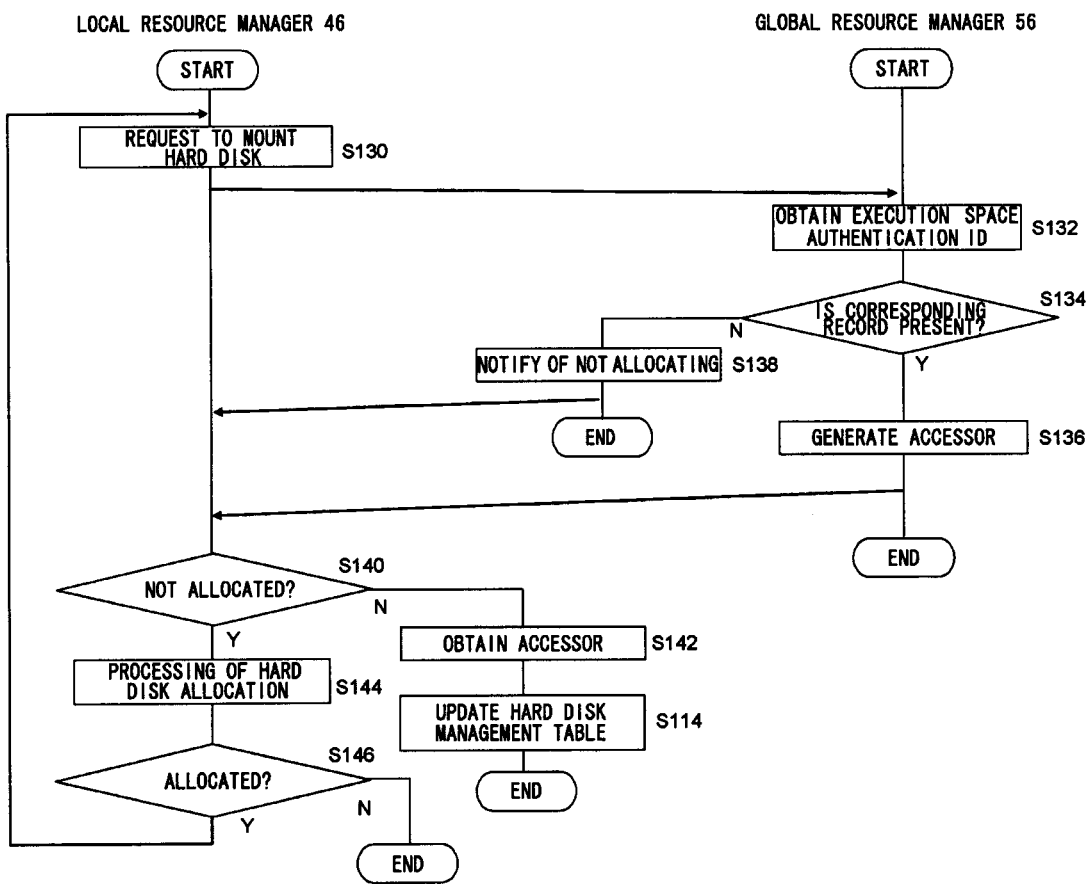
FIG. 21 is a flowchart showing procedures for mounting a hard disk to an execution space according to the present embodiment.
Figure 23:
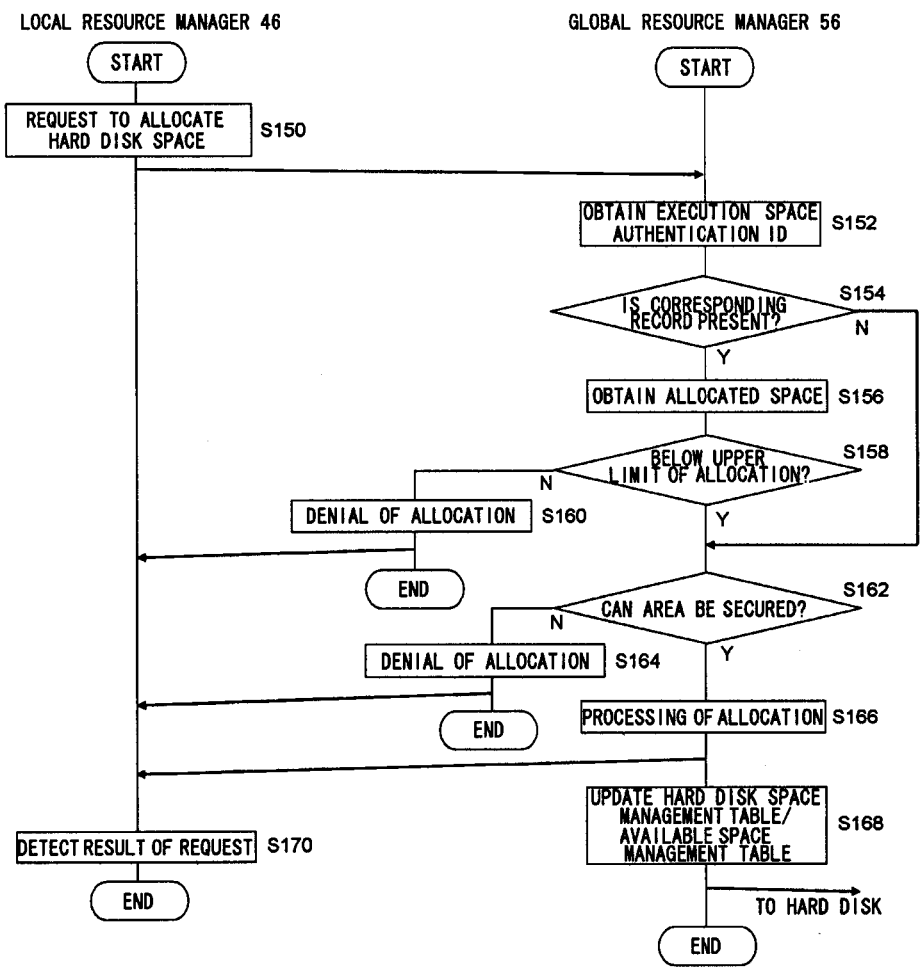
FIG. 23 is a flowchart showing processing procedures for allocating hard disk space to an execution space according to the present embodiment.

Next, an explanation of the procedures for allocating space of the hard disk 82 included in the resources of the information processing apparatus 100 is given below. The hard disk 82 is not described in the execution space initialization parameter table 200B shown in FIG. 6, as with the device 62. Therefore, in the explanation described below, space of the hard disk 82 is allocated on request from a process 32. Alternatively, the execution space initialization parameter table 200B may include the hard disk space that should be secured initially when started, for the execution space 20. Then the hard disk space may be allocated to the execution space 20 before the generation of the process 32, as with the case of the device 62. In this case, the request for allocation from the local resource manager 46 to the global resource manager 56 shown in FIG. 21 and FIG. 23 is issued firstly, among the procedures for allocation of hard disk space described below.

Figure 19:
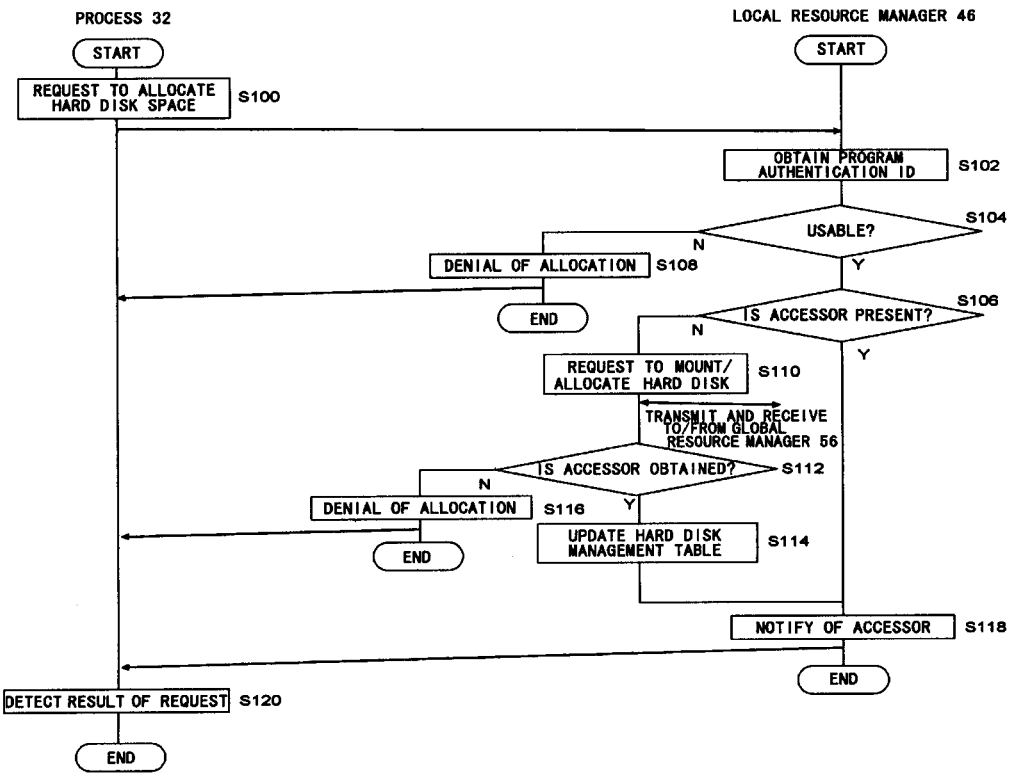
FIG. 19 is a flowchart showing procedures for allocating hard disk space to a process according to the present embodiment.

FIG. 19 is a flowchart showing procedures for allocating hard disk space to the process 32. This procedure is performed in case hard disk space is allocated when the process 32 is generated, in case an access to the hard disk 82 is required in the middle of processing or in case of running out of hard disk space. The process 32 firstly requests the local resource manager 46 which belongs to the same execution space 20 to allocate hard disk space (S100). The local resource manager 46 accepts the request for allocation issued from the process 32 executed in the execution space 20 to which the local resource manager 46 belongs. By the communication transmitting and receiving the request, the process ID 172 of the process 32 issuing the request is identified. The local resource manager 46 makes an inquiry to the local name manager 44 based on the process ID 172 and obtains the program authentication ID of the process 32 issuing the request (S102). Subsequently, the local resource manager 46 refers to the process resource management table 160 based on the program authentication ID and checks whether the process 32 issuing the request is permitted to use the hard disk 82 by referring to the hard disk usability field 230 (S104). If it is not permitted to use the hard disk 82 (N in S104), the local resource manager 46 returns an error to the process 32 as a denial of allocation of the hard disk 82 (S108).

If the hard disk 82 can be used (Y in S104), the local resource manager 46 subsequently refers to a hard disk management table and checks whether the accessor of the hard disk 82 is present (S106). The hard disk management table is a table storing the accessor obtained previously, when hard disk space is allocated to the execution space 20. According to the present embodiment, the execution space 20 reserves the accessor of the hard disk area once allocated, by which the accessor is re-used next time a process 32 in the same execution space 20 needs to access the hard disk 82. An exemplary structure of the hard disk management table will be described later.

If the accessor for the hard disk 82 is not present in the hard disk management table or the hard disk management table itself is not present (N in S106), the local resource manager 46 requests the global resource manager 56 to mount the hard disk 82 and, if necessary, to allocate hard disk space (S110). The global resource manager 56 receives the request, allocates hard disk space to the execution space 20 issuing the request, if necessary, and when the mounting of the hard disk 82 completes, returns the generated accessor to the local resource manager 46. If mounting and/or allocation are not possible, the global resource manager 56 returns an error. The procedures for requesting the global resource manager 56 to mount and to allocate hard disk space will be explained in detail in FIG. 21 and in FIG. 23. On obtaining the accessor from the global resource manager 56 (Y in S112), the local resource manager 46 writes the accessor in the hard disk management table (S114). If the accessor can not be obtained (N in S112), an error is returned to the process 32 as a denial of allocation of hard disk space (S116).

If the accessor for the hard disk space to be allocated to the process 32 has been obtained already (Y in S106), or the accessor is obtained newly by issuing the request to the global resource manager 56 (Y in S112), the local resource manager 46 notifies the process 32 of the accessor (S118). Then the process 32 detects that the hard disk space allocation is permitted or not permitted (S120) and the series of processing ends, accordingly. The process 32, supplied the permission for the allocation, accesses the hard disk 82 based on the obtained accessor whenever necessary.

Figure 20:
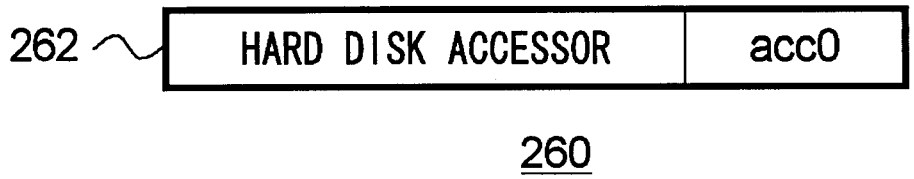
FIG. 20 shows an exemplary structure of a hard disk management table according to the present embodiment.

FIG. 20 shows an exemplary structure of the hard disk management table that is referred to in step S106 and updated in step S114 in FIG. 19. The hard disk management table 260 includes a hard disk accessor field 262. When a hard disk space is allocated to the execution space 20, the obtained accessor is described in the hard disk accessor field 262. Thus, if the accessor is present in the hard disk accessor field 262, it is understood that an area of the hard disk 82 has been allocated to the execution space 20. The local resource manager 46 manages the hard disk management table 260 with the local resource management table 150, the device management table 250 or the like. The hard disk management table 260 is stored in the memory 70 or the like.

Next, the procedure for allowing the local resource manager 46 to request of the mount the hard disk 82 and of the allocation of hard disk space shown in steps S110-S114 in FIG. 19 is described in detail below. FIG. 21 is a flowchart showing procedures for mounting the hard disk 82 to the execution space 20. If, in step S106 in FIG. 19, the execution space 20 has not established an access to the hard disk 82 (N in S106), the local resource manager 46 initially requests the global resource manager 56 to mount the hard disk 82. The reason for this is that, if hard disk space has allocated to the execution space 20 in the previous processing in the information processing apparatus 100, it is required to access the same record in the hard disk 82. For example, to re-start a game of which information has been saved and the processing has been ended once, it is required to read the saved information on progress of the game. Therefore, the request for mounting is made first and the presence of the corresponding record in the hard disk 82 is checked, and if present, the area is mounted, accordingly.

Initially, the local resource manager 46 requests the global resource manager 56 to mount the hard disk 82 (S130). This step corresponds to the request for mounting in the step S110 in FIG. 19. By the communication transmitting and receiving the request, the execution space provisional ID 132 of the execution space 20 issuing the request is identified. The global resource manager 56 makes an inquiry to the global name manager 54, based on the execution space provisional ID 132 and obtains the execution space authentication ID 104 of the execution space 20 issuing the request (S132). Subsequently, the global resource manager 56 refers to a hard disk space management table stored in the hard disk 82, based on the execution space authentication ID 104 and checks whether the record corresponding to the execution space 20 issuing the request is present (S134). The hard disk space management table is a table which associates the capacity of the hard disk area allocated to the execution space 20 and the initial address of the area with the execution space authentication ID 104. As described above, each process 32 in the execution space 20 is required to access the same record regardless of whether the power of the information processing apparatus 100 is turned on or off. Thus, the hard disk space management table is stored in the hard disk 82 itself so that the table is not lost even when the power of the information processing apparatus 100 is turned off. An exemplary structure of the hard disk space management table will be described later.

If the corresponding record is present in the hard disk space management table (Y in S134), the accessor for accessing the area is generated and supplied to the local resource manager 46 (S136). If not present (N in S134), the local resource manager 46 is notified that hard disk space has not been allocated to the execution space 20 (S138).

If the notification, indicating that hard disk space is not allocated, is not received (N in S140), the local resource manager 46 obtains the accessor generated by the global resource manager 56 (S142) and writes the accessor in the hard disk management table 260 (S114). This step corresponds to the step S114 in FIG. 19. Meanwhile, if the local resource manager 46 receives the notification, indicating that the hard disk 82 is not allocated (Y in S140), the local resource manager 46 executes the processing for allocation of hard disk space (S144). Although the local resource manager 46 and the global resource manager 56 actually perform this step in cooperation, the procedure is depicted as one step in FIG. 21, to be understood easily, while specific procedures are shown in FIG. 23.

If the hard disk space is allocated to the execution space 20 as the result of the processing for allocation of the hard disk space in step S144 (Y in S146), the local resource manager 46 requests to mount the hard disk 82 again (S130). Then, through the similar procedures as described above, the local resource manager 46 obtains the accessor for accessing the hard disk 82 from the global resource manager 56, eventually. If the hard disk space is not allocated (N in S146), a series of procedures ends accordingly. The steps "end", following the step S114 or the N in step S146, indicates that the procedure for mounting the hard disk 82 ends. If allocation of hard disk space has requested from the process 32 as a previous step of the procedure, the processing of notifying the process 32 of the result follows as shown in FIG. 19. More specifically, after the step S114, processing of notification of the accessor is performed in a similar fashion as the steps subsequent to the step S114 in FIG. 19 (S118). On the other hand, after the N in step S146, it is interpreted that an accessor can not be obtained and an error is returned to the process 32 as a denial of allocation as shown in the step S116 in FIG. 19.

FIG. 22 shows an exemplary structure of the hard disk space management table referred to in step S134 in FIG. 21. The hard disk space management table 270 includes an execution space authentication ID field 104A, an allocated space field 272 and an initial address field 274. The execution space authentication IDs 104 of the execution spaces 20, to which hard disk space is already allocated, are described in the execution space authentication ID field 104A. The capacities of the hard disk areas allocated to each execution space 20 are described in the allocated space field 272. The initial addresses of hard disk areas allocated to each execution space 20 are described in the initial address field 274. In case hard disk space is newly allocated to the execution space 20, an entry is added to the hard disk space management table 270. In case hard disk space is allocated additionally, the allocated space field 272 or the like is updated as appropriate. The hard disk space management table 270 is stored in the hard disk 82 as described above. Parameters for managing the areas of the hard disk 82 other than the initial address can be included in the hard disk space management table 270.

FIG. 23 is a flowchart showing processing procedure for allocating hard disk space to the execution space 20. This processing may be performed as the step S144 after trial processing of mounting is performed. Alternatively, this processing may be performed independently and the mounting processing of FIG. 21 may be performed afterward. The latter approach is adopted in case that it is known that the hard disk space has not to been allocated beforehand (e.g., in case of the initial processing when the software is newly started). Similarly, also when additional allocation of hard disk space is required even though some hard disk space has been already allocated, the hard disk space allocation processing of FIG. 23 is initially performed.

First, the local resource manager 46 requests the global resource manager 56 to allocate the hard disk 82 (S150). This step corresponds to the request for allocation in the step S110 in FIG. 19. By the communication transmitting and receiving the request, the execution space provisional ID 132 of the execution space 20 issuing the request is identified. The global resource manager 56 makes an inquiry to the global name manager 54, based on the execution space provisional ID 132 and obtains the execution space authentication ID 104 of the execution space 20 issuing the request (S152). Subsequently, the global resource manager 56 refers to the hard disk space management table 270 stored in the hard disk 82, based on the execution space authentication ID 104 and checks whether a record corresponding to the execution space 20 issuing the request is present (S154). When the processing of allocation of the hard disk space shown in FIG. 23 is performed as a part of the processing of mounting shown in FIG. 21, step S152 and step S154 in FIG. 23 can be omitted as appropriate, since the processing in the steps are as same as those of the step S132 and the step S134 in FIG. 21.

In case that the corresponding record is present, i.e., the request from the local resource manager 46 is a request for allocation of additional hard disk space (Y in S154), the same hard disk space management table 270 is referred to and the capacity of the space already allocated to the execution space 20, issuing the request, is obtained from the allocated space field 272 (S156). Subsequently, the global resource manager 56 obtains the upper limit for allocation of hard disk space to the execution space 20 issuing the request from the maximum hard disk space field 114A in the global resource management table 140 and checks whether the capacity of the space already allocated is below the upper limit of allocation (S158). If the capacity of the space already allocated is equal to or more than the upper limit of the allocation (N in 158), an error is returned to the local resource manager 46 as a denial of allocation since further allocation is impossible (S160).

If the capacity of hard disk space already allocated to the execution space 20 issuing the request is below the upper limit of the allocation (Y in S158) or the request for allocation is first issued from the local resource manager 46 (Y in S158), the global resource manager 56 refers to an available space management table stored in the hard disk 82 and checks whether allocatable space remains available in the hard disk 82 (S162). In the available space management table, the capacities of available areas and initial addresses of the available areas in the hard disk 82 are described. The table is stored in the hard disk 82 with the hard disk space management table 270. An exemplary structure of the available capacity management table will be described later. If the allocatable space is not left in the hard disk 82 (N in S162), the global resource manager 56 returns an error to the local resource manager 46 as a denial of allocation. If there exist allocatable space (Y in S162), an area to be allocated is determined and processing for allocation is performed, e.g., by notifying the local resource manager 46 of the information (S166). The local resource manager 46 may include the capacity of the space to be allocated in the request for allocation. Alternatively, the global resource manager 56 may determine the capacity as appropriate. Subsequently, the global resource manager 56 accesses the hard disk 82 and updates changed parameters among parameters included in the hard disk space management table 270 and the available space management table (S168).

The local resource manager 46 detects information on the allocated hard disk space or the error transmitted from the global resource manager 56 (S170). The series of processing ends, accordingly. The "end" refers to the end of the processing of hard disk space allocation. Therefore, in case the processing of FIG. 23 is performed as the step S144 in FIG. 21, i.e., as a part of the processing of mounting, it is determined whether the allocation completes in step S146 in FIG. 21, instead of proceeding to the "end". If the allocation is performed (Y in S146), the request for mounting is performed in S130, accordingly. Even if the hard disk space allocation of FIG. 23 is performed independently, in case that the allocation succeeds, the processing of mounting shown in FIG. 21 is performed. Then, by allowing the local resource manager 46 to obtain the accessor generated in the global resource manager 56, the access from the execution space 20 to the hard disk 82 is established.

Figure 24:
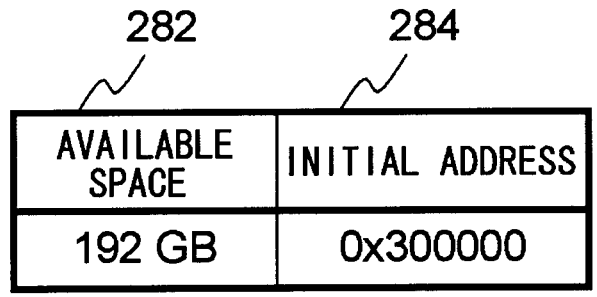
FIG. 24 shows an exemplary structure of an available space management table according to the present embodiment.

FIG. 24 shows an exemplary structure of the available space management table referred in step S162 and updated in step S168 in FIG. 23. The available space management table 280 includes an available space field 282 and an initial address field 284. The capacity of the available area in the hard disk 82 is described in the available space field 282. The initial address of the available area is described in the initial address field 284. When hard disk space is allocated to the execution space 20, the available space management table 280 is updated as appropriate. In the available space management table 280, parameters for managing areas in the hard disk 82 may be included, other than the parameters for the initial address.

According to the present embodiment, as shown in FIG. 19, FIG. 21 and FIG. 23, the accessor for the hard disk 82, to which the access is once established, is reserved in the execution space 20. Next time a process 32 in the same execution space 20 requests to access the hard disk 82, it is checked initially in the execution space 20 whether an access to the hard disk 82 has been established previously. If established, the allocation can be completed only with processing inside the execution space 20. Thus, in a similar fashion as with the cases of amounts of memory, CPU time, and devices, the number of communications with elements external to the execution space 20 decreases and the load of response to the request for allocation can be distributed. As a result, overhead with respect to allocation processing can be reduced.

The resources allocated to an execution space 20 or a process 32 through the processing described above are returned to the global resource manager 56 or to the local resource manager 46 when the extinction of the execution space 20 or the process 32 occurs. The term "extinction" represents, for example, a case where a game being played is completed and an execution space 20 which was executing the game becomes unnecessary accordingly, or a case where a stage in a game completes and a program which was processing the stage completes accordingly. The processing of the "restoration" of resources begins with the global resource manager 56 or the local resource manager 46, detecting the extinction of an execution space 20 or a process 32. Then a entry corresponding to the extinct execution space 20 or the process 32 is removed from the global resource management table 140 or the process resource management table 160, respectively. Further, by updating the hard disk space management table 270 or the available space management table 280 as appropriate, or the like, the returned resources are set to be allocatable to other execution spaces 20 or other processes 32.

Figure 25:
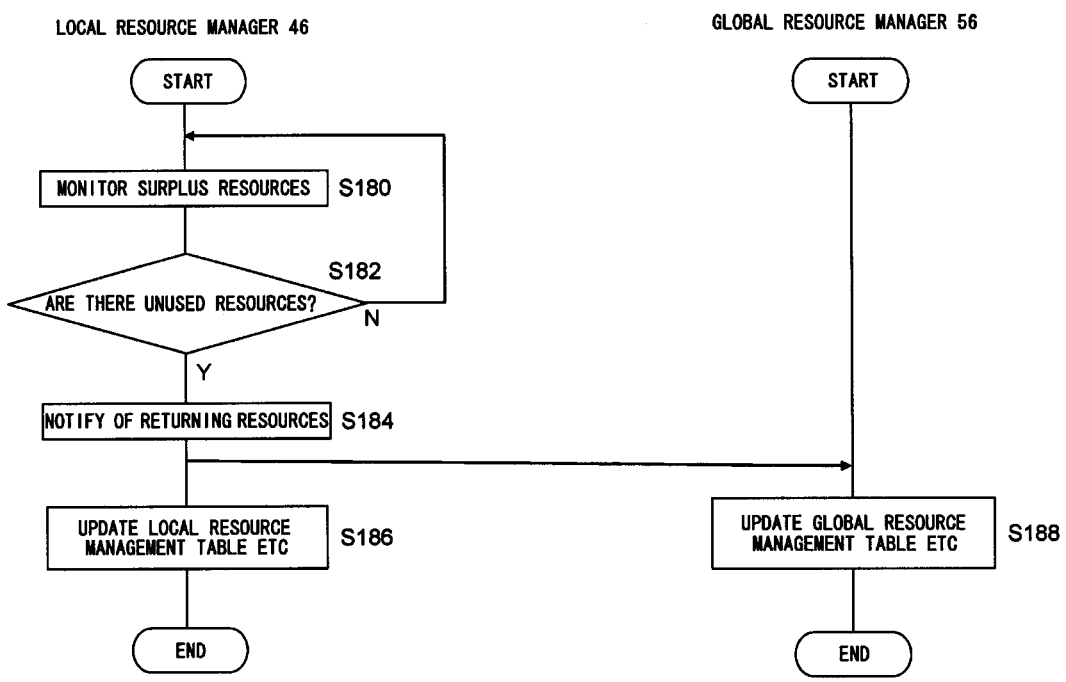
FIG. 25 is a flowchart showing processing procedures for returning an unused resource allocated to an execution space according to the present embodiment.

Among the resources allocated to the execution space 20, resources unused for a predetermined period of time (e.g., resources which have become in surplus since the process 32 is extinguished as described above) may be returned from the execution space 20 to the global resource manager 56. FIG. 25 is a flowchart showing processing procedures for returning resources, allocated to the execution space 20, in such cases. The local resource manager 46 monitors the temporal variation of resources which have been allocated to a corresponding execution space 20 but not allocated to any processes 32, i.e., surplus resources (S180). The surplus resources are obtained from the deference between: a) the local resource management table 150, the device management table 250 and the hard disk management table 260; and b) the process resource management table 160. If certain resources remain to be the surplus resources for a predetermined period, the resource is determined to be an unused resource (Y in S182) and the notification, that the unused resource is to be returned, is issued to the global resource manager 56 (S184). If the resource is an amount of memory or CPU time, the determination in step S182 is made according to whether the resource, having quantity more than the predetermined quantity, is being in surplus for the predetermined period of time. If that condition is satisfied, the resource is returned. The predetermined period of time or the predetermined quantity may be defined for respective software at its development stage.

The local resource manager 46 further deletes the content of the returned resource in a management table, corresponding to the returned resource, included in the local resource management table 150, the device management table 250 or the hard disk management table 260 (S186). The global resource manager 56 updates a management table, corresponding to the returned resource, included in the global resource management table 140, the hard disk space management table 270 or the available space management table 280, as appropriate (S188). The step S180 of monitoring of surplus resources is continued as far as the execution space 20 exists (N in S182). Even after an unused resource is returned, the monitoring of other resources is continued. According to the procedure described above, a resource allocated to an execution space 20 can be returned depending on the usage, and becomes available for other execution spaces. Thus waste in resource allocation is restricted and resources can be used more effectively.

The processing of allocation of resources according to the explanation given above is performed for: a) the execution space 20 which should be generated when the information processing apparatus 100 is started; and b) the processes 32 which belongs to the execution space 20, which are defined by the system initialization parameter 102. Explanations will be given below of the case wherein various parameters defined by the system initialization parameter 102 are changed after the information processing apparatus 100 is started. More specifically, explanations will be given of the cases wherein an execution space 20 is added, a program to be executed is added, a resource is added and/or the limitation on resource allocation is changed.

The case where an execution space 20 is added after the information processing apparatus 100 is started, is for example, a case where a web browser is started while a user is playing a game. In this case, an additionally-started execution space parameter is given to the global initializer 52. This procedure is performed, for example, by allowing the global initializer 52, which detects the request for execution of the web browser through a user input, to read the parameter from the software file of the web browser stored in the external storage 80 and to load the parameter into the memory 70. FIG. 26 shows an exemplary structure an additionally-started execution space parameter table which describes the additionally-started execution space parameters. The additionally-started execution space parameter table 300 has the same structure as the system initialization parameter table 102A shown in FIG. 5. However, only values for the execution space 20, which is additionally started, are described in respective fields.

Based on each parameter included in the read additionally-started execution space parameter table 300, the global initializer 52 performs a similar processing to the processing of steps S12-S18 in FIG. 3, i.e., the processing performed by the global initializer 52 when the information processing apparatus 100 is started. However, since the execution space name table 130 and the global resource management table 140 have been already created when the information processing apparatus 100 is started, steps S16 and S18 represent processing of adding an entry, corresponding to the additional execution space, to each table. Likewise, in the execution space 20 additionally started, the local initializer 42 performs a similar processing to the processing of steps S20-S28 in FIG. 3, i.e. the processing performed by the local initializer 42 when the information processing apparatus 100 is started. However, since the local resource management table 150, the process name table 170 and the process resource management table 160 have been already created when the information processing apparatus 100 is started, steps S22, S26 and S28 represent processing of adding an entry, corresponding to a process 32 included in the additional execution space 20, to each table. Hereafter, resources are managed in a similar way as for the execution space 20 generated when the information processing apparatus 100 is started.

The case where a process 32 is added to an execution space 20, which has been already generated, after the information processing apparatus 100 is started is for example the case where, a user changes game mode, initially set to sound-off mode, to sound-on mode. In this case, a program file of the additional process 32 is given to the local initializer 42. This procedure is performed, for example, by allowing the local initializer 42, which detects the request for execution of the new process 32 through an instruction from the OS controlling the execution space 20, a user input or the like, to read a corresponding program file from a software file stored in the external storage 80 or the like, and to load the file into the memory 70. In the above example, the local initializer 42 which detects the request to execute the sound processing through a user input, reads a program file of sound processing program from a game file. The structure of the program file is same as the program information table 222A shown in FIG. 8.

Based on the read program file, the local initializer 42 performs a similar processing to a part of the processing of steps S24-S28 in FIG. 3, i.e., the processing performed by the local initializer 42 when the information processing apparatus 100 is started. However, in a similar fashion as the case of adding an execution space 20, an entry corresponding to the additional process 32 is added to the process name table 170 and the process resource management table 160. Hereafter, the resources are managed in a similar way to that of the process 32 which has been present in the execution space 20 since the beginning.

The case where a resource itself is added after the information processing apparatus 100 is started, is for example, a case where a user changes a game controller with buttons, used initially, to a controller shaped like a steering-wheel during playing a car race game. In this case, additional-resource information is given to the global initializer 52. This procedure is performed, for example, by allowing the global initializer 52, which detects the change in resources through a user input or the like, to read corresponding information from a software file stored in the external storage 80 or the like and to load the information into the memory 70. In the above example, the global initializer 52, which detects the change of controllers, reads additional resource information of the controller shaped like a steering-wheel from a game file. Alternatively, the procedure is performed by allowing the global initializer 52, which detects the addition of the resource, to read information, which is defined by a user, when the resource is added, for the OS which controls the resource. Otherwise, the additional resource information may be obtained directly by allowing the global initializer 52, which detects the addition of a resource, to encourage the user to input the mode.

FIG. 27 shows an exemplary structure of additional-resource information when the device 62 is added as the additional resource. The additional device information table 310 includes an execution space authentication ID field 104A and a device usability field 312. In this example, a device 62 having a device ID "0x14" is added to. The character string indicating whether or not each execution space 20 can use the device 62 is described in the device usability field 312. In FIG. 27, "○" indicates that the device can be used and "x" indicates that the device can not be used. FIG. 28 shows an exemplary structure of additional-resource information in case an amount of memory is added as the additional resource. An additional memory amount information table 320 includes an execution space authentication ID field 104A and an additional memory amount field 322. By adding an amount of memory, the maximum allocatable memory amount for each execution space 20 can be increased. The increment of the maximum allocatable memory amount for each execution space 20 is described in the additional memory amount field 322.

The global initializer 52 updates the global resource management table 140, based on an additional resource information table. For example, in case the device 62 is added, based on the additional device information table 310, the device ID of the added device 62 is added to the available device ID field 112A in the global resource management table 140. In case an amount of memory is added, based on the additional memory amount information table 320, the increment of the memory amount is added to the value in the maximum memory amount field 108A in the global resource management table 140. Similar additional resource information tables may also be defined for respective programs and by allowing the local initializer 42 to read the tables, the information may be reflected to the process resource management table 160. After the global resource management table 140 or the process resource management table 160 is updated, when allocating a resource to each execution space 20 or each process 32, it is determined whether or not the resource can be allocated, based on the respective updated tables.

The case where a limitation on resource allocation to the execution space 20 or the process 32 is changed after the information processing apparatus 100 is started, is for example, a case where a user, playing a game, changes an image display mode from an ordinary pixel number mode to a high-resolution image mode, and thus, the upper limit for the amount of memory to be allocated is increased. In this case, available resource change information is given to the global resource manager 56 or the local resource manager 46. This procedure is performed, for example, by allowing the global initializer 52, which detects the change in mode (e.g., mode of the image quality or the like) through a user input or the like, to read available resource change information corresponding to the status after the mode alteration from a software file stored in the external storage 80 or the like and to load the information into the memory 70. Alternatively, when the mode of the image quality or the like is changed, the user may be prompted to input and set the available resource change information. Otherwise, the system controller 50, which detects the generation or the suspension of other execution spaces 20, may generate, by itself, the available resource change information, based on priority levels predefined for each execution space 20.

FIG. 29 shows an exemplary structure of a available resource change information obtained by the global resource manager 56. The global resource change information table 330 includes an execution space authentication ID field 104A, a maximum memory amount increment field 332, a maximum CPU time increment field 334, an additional available device ID field 336 and a maximum hard disk space increment field 338. These fields correspond to the execution space authentication ID field 104A, the maximum memory amount field 108A, the maximum CPU time field 110A, the available device ID field 112A and the maximum hard disk space field 114A in the global resource management table 140 shown in FIG. 10, respectively. In the global resource change information table 330 are described changes from the maximum amount of memory, the maximum CPU time, the available device ID and the maximum hard disk space for each execution space 20 described in the global resource management table 140. By attaching a symbol "+" or "−" at the head of each value, it is identified whether the resource is incremented or decremented. The global resource manager 56 updates the global resource management table 140, based on the global resource change information table 330. Hereafter, when allocating a resource to each execution space 20, it is determined whether or not the resource can be allocated, based on the updated global resource management table 140.

FIG. 30 shows an exemplary structure of a available resource change information table obtained by the local resource manager 46. The local resource change information table 340 includes a program authentication ID field 224, a maximum memory amount increment field 342, an additional available device ID field 344 and a hard disk usability field 230. These fields correspond to the program authentication ID field 224, the maximum memory amount field 226, the available device ID field 228 and the hard disk usability field 230 in the process resource management table 160 shown in FIG. 12, respectively. In the local resource change information table 340 are described: a) changes from the maximum amount of memory and the available device ID for the process 32 described in the process resource management table 160, and b) whether or not the hard disk can be used. By attaching a symbol "+" or "−" at the head of the maximum amount of memory and the available device ID, it is identified whether the respective resources are incremented or decremented. The local resource manager 46 updates the process resource management table 160, based on the local resource change information table 340. Hereafter, when allocating resources to each process 32, it is determined whether or not the resource is allocated, based on the updated process resource management table 160.

An explanation is given below of an exemplary structure of the execution space authentication ID 104 and the program authentication ID. Both the execution space authentication ID 104 and the program authentication ID have data amount of about 16 bits to 64 bits and consist of a predefined plurality of fields, respectively. The execution space authentication ID 104 consists of, for example, a version information field, a device type information field, a region code field, an execution space OS information field, a vendor information field and/or the like. The version information field indicates version information of an ID system or the like. The device type information field indicates the type of device or the like of the information processing apparatus 100 which executes software. The region code field indicates the region code of software. The execution space OS information field indicates information on OS or the like which is started in the execution space 20 to control the execution of software. The vendor information field indicates a vendor or the like of software which is the entity of execution. The execution space authentication ID 104 is determined uniquely by standardizing and integrally controlling the code, defined in the device type information field, the execution space OS information field and the vendor information field.

The program authentication ID consists of, for example, a version information field, a region code field, a vendor information field, a program identification code field or the like. The version information field, the region code field and the vendor information field are the same fields as described above about the execution space authentication ID 104. The program identification code field is a field for identifying a program in a software vendor and managed by the vendor. This enables the program authentication ID to be determined uniquely.

In the present embodiment described above, the process 32 initially issues a request for allocation of the resources to the local resource manager 46 in the same execution space 20. The local resource manager 46 obtains the program authentication ID of the process 32 which issues the request as shown in FIG. 15, FIG. 16 and FIG. 19 (S52, S72, and S102). Permission for allocation of resources is given only within the limitation on allocation, which is obtained based on the program authentication ID (S54, Y in S74 and Y in S104). Therefore, even if a process generated by the illegal (herein after referred to as an illegal process) requests excessive allocation of resources, the allocation more than the limitation is refused. Thus, the illegal process does affect other processes 32 and other execution spaces 20, which are processed properly. The term "illegal" represents an illegal factor, such as an intrusion via a network, a computer virus, a program including an illegal part, or the like.

Furthermore, even if an illegal process spoofs the control process of the execution space 20, for example, the local resource manager 46, the configuration of the present embodiment prevents the illegal process from occupying the resources. Consequently, the bad influence which the illegal process causes on other execution spaces 20 can be minimized. The mechanism will be explained below.

Firstly, it will be assumed that an illegal process, spoofing the local resource manager 46 in a certain execution space 20, may request the global resource manager 56 to allocate resources. As shown in FIG. 14, FIG. 18 and FIG. 23, the global resource manager 56 obtains the execution space authentication ID 104 of the execution space 20 issuing the request (S32, S92 and S152). The execution space authentication ID 104 is obtained, based on the execution space provisional ID 132 which is identified automatically when the request is received. Therefore, the illegal process can not spoof the local resource managers 46 in other execution spaces 20. In addition, the allocation is permitted only within the limitation on allocation, defined for each execution space authentication ID 104 in advance (Y in S34, Y in S94 or Y in 158). Thus, even if the illegal process requests excessive allocation of resources, the illegal process can secure the resources only within the limitation. Thus an influence to other execution spaces 20 or the like, that is properly working, is small.

Further, it will be assumed that an illegal process may request the local resource manager 46 in other execution spaces 20 to allocate resources unrighteously. That is, the illegal process may abuse the function of the local resource manager 46, i.e., the function for allocating the resources reserved in the execution space 20 in response to a request issued from a process 32 in the same execution space 20. Therefore, in the present embodiment, the local resource manager 46 is set to accept only a request via communication in the execution space 20 to which the local resource manager 46 belongs. Since the request issued from the illegal process to the local resource manager 46 in other execution spaces 20 is communicated across the execution spaces 20, the request is neglected by the mode described above. Thus, the illegal process is prevented from grabbing the resources allocated to other execution spaces 20.

Furthermore, it will be assumed that an illegal process may request low-level functions (e.g., the device 62, the hard disk 82, the OS or the like) to allocate a resource directly. Therefore, in the present embodiment, functions which belong to such low-level functions, are set to accept only the request issued via the predefined communication from the global resource manager 56. For example, the requests issued via communication only in the kernel may be accepted. In addition, a process 32, processed in each execution space 20, is set so as not to perform this communication. This invalidates the request for allocation of resources issued from the illegal process to the low-level functions. Consequently, the illegal process is prevented from securing a resource excessively.

To improve the safety, additional measures may be taken to prevent tampering of a table which supports the determination of whether or not a resource can be allocated. More specifically, the measure to prevent tampering is taken for the system initialization parameter table 102A, the execution space initialization parameter table 200B, the to-be-started program list table 220B, a program file, the additionally-started execution space parameter table 300, the global resource change information table 330, the local resource change information table 340, or the like. For example, an electronic signature or a MAC (Message Authentication Code) is applied on those tables. This prevents that an illegal determination on whether or not a resource can be allocated is made by tampering the setting on the allocation of resources itself. Thus, safety improves with respect to excessive resource allocation by an illegal process.

According to the present embodiment described above, the execution space authentication ID (i.e., an ID unique to the execution space) is set and limitation on resource allocation is set for each execution space authentication ID. This prevents allocation of resources from being made beyond the limitation, even if the illegal process spoofs a process which manages the execution space (e.g., the local resource manager) and requests to allocate resources. Thus, the resources to be allocated to other execution spaces are not occupied. Further, according to the present embodiment, the resource allocation is determined to be permitted or not in two steps, i.e., for each process and for each execution space. In determining for each execution space whether or not a resource is allocated, the execution space authentication ID for the execution space issuing the request is automatically discovered based on the execution space provisional ID identified by the communication used for transmitting and receiving the request. Therefore, when the same programs are processed in two execution processes, even if one process which executes the program becomes an illegal process, the process can not spoof the other process which executes the program. Even if the illegal process spoofs the local resource manager of the execution space to which the illegal process belongs, the illegal process can not spoof the other local resource manager of the other execution process. As a result, the extent of resources which an illegal process can secure is up to the limitation on the allocation of resources for the execution space to which the process belongs. Thus the influence of the illegal process to other execution spaces can be restricted.

According to the present embodiment, an extra amount of memory or CPU time is secured in each execution space. In addition, the accessor of a device or a hard disk with which a process has once established an access is secured in the execution space even after the access by the process completes. This enables another processing of allocation to be completed inside the execution space in case the resources secured in the execution space satisfy the need of a process which newly requests to allocate resources. Thus the number of communications with elements external to the execution space decreases and the load of the processing for responding to the request for allocation is distributed. As a result, overheads with respect to the processing of allocation can be restricted. Meanwhile, since resources which are not used for a predefined period of time is returned from the execution space, wasteful allocation is restricted and effective resource usage is implemented.

Furthermore, the processing of resource management according to the present embodiment is performed automatically by reading information included in software file or the like. Even when the setting, relating to resources, is changed after the information processing apparatus is started, just reading basic parameters, which indicates the status after the alteration, additionally from the software file or the like enables smooth shifting from the state before the alteration. This allows a user to manage resources safely and efficiently in a flexible manner without having to be aware of the processing of the present embodiment, particularly.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, according to the present embodiment, the functions of the global initializer 52, the global name manager 54 and the global resource manager 56 are included in the system controller 50 which belongs to a lower level than the execution spaces 20 executing application programs. However, an execution space for controlling may be generated at the same level as the execution spaces 20 and the functions described above may be implemented in the execution space for controlling. Also in this case, the same effect as the present embodiment can be obtained.

Moreover, regarding a device which is obviously accessed only by a certain execution space (e.g., a dedicated controller for a certain game), other execution spaces is not affected even if the device is occupied by an illegal process. In addition, since the device is not included in the available devices for other execution spaces, an illegal process in other execution spaces can not occupy the device. Therefore, there is no need to make determinations in two steps on whether or not allocation can be made as described in the present embodiment. In such a case, the processing of determination in the local resource managers 46 may be omitted. In this case, the local resource manager 46, which receives a request for allocation from a process 32, issues the request for allocation to the global resource manager 56 with the program authentication ID of the process 32 issuing the request. Then the global resource manager 56 may determine directly whether or not the allocation to the process 32 can be made, based on the program authentication ID sent from the local resource manager 46 and the execution space authentication ID 104 of the execution space 20 issuing the request. In this manner, by changing the hierarchy in which the determination is made on whether or not the allocation can be made, depending on the attribute of resources, the processing of determination is performed efficiently while the safety is secured as the present embodiment.

The present invention can be used for an information processing apparatus, such as a computer, a game machine or the like.

What is claimed is:
1. An information processing method comprising:
initializing an application on an information processing apparatus by a predetermined system controller of an operating system launched thereon;
generating an execution space for the application, the execution space being an environment that executes the application on the predetermined operating system;
creating, in the execution space of the application, an execution space controller, including within a local resource manager;
allocating, by a global resource manager of the system controller, resources of the information processing apparatus to the execution space in advance of execution of the application;
starting one or more processes of the application in the execution space;
allocating, by the local resource manager of the execution space, the resources allocated thereto to each of the processes started in the execution space, wherein surplus resources, which result from the local resource manager subtracting the resources allocated to the processes started in the execution space from the resources allocated to the execution space, are reserved in the execution space;

requesting the additional resource allocation from the process;

determining by the local resource manager whether or not the surplus resources, reserved in the execution space to which the process belongs, satisfies the request for the additional resource allocation;

upon the surplus resources not satisfying the request, requesting by the local resource manager to the global resource manager to allocate additional resources to the execution space; and allocating by the local resource manager the additional resources, included in the surplus resources reserved in the execution space and the resources allocated additionally by the global resource manager to the execution space, to the process.

2. The information processing method according to claim 1, further comprising:

requesting additional resource allocation from the process;

determining by the local resource manager whether or not the surplus resources, reserved in the execution space to which the process belongs, satisfies the request for the additional resource allocation; and upon the surplus resources satisfying the request, allocating by the local resource manager the additional resources, included in the surplus resources, to the process.

3. The information processing method according to claim 1, wherein in the allocating additional resources to the execution space, the additional amount of resources allocated to the execution space at a time is a positive integral multiple of addition unit, which is a unit of additional amount of resources defined for each execution space.

4. The information processing method according to claim 1, wherein in the allocating additional resources to the execution space, the resources are allocated in the range of limitation defined for each execution space.

5. The information processing method according to claim 1, wherein surplus resources which are not allocated by the local resource manager to the process for a predefined period of time, included in the surplus resources reserved in the execution space, are removed by the global resource manager from the resources allocated to the execution space.

6. The information processing method according to claim 1, wherein for each of a plurality of applications initialized by the predetermined operating system, a plurality of execution spaces are simultaneously generated, and wherein the respective processes of the plurality of applications are run on a same execution space among the plurality of execution spaces if classified by a same logical factor.

7. An information processing apparatus in which a plurality of execution spaces are generated comprising:

a first resource manager of a predetermined operating system operable to manage resources of the entire information processing apparatus and to allocate resources in advance to a plurality of execution spaces that are respectively generated by the predetermined operating system when one or more applications are initialized; and a second resource manager provided for each of the plurality of execution spaces and operable to manage resources, allocated by the first resource manager for the execution space to which the second resource manager belongs, and allocating resources to one or more processes of a respective application executed in the execution space to which the second resource manager belongs apart from the predetermined operating system, wherein the second resource manager is created upon the initialization of a respective execution space, wherein the second resource manager is further operable to request to the first resource manager resources on behalf of the one or more processes that are additional to those allocated for the execution space, wherein the second resource manager receives a request for resource allocation from a process executed in the execution space to which the second resource manager belongs and allocates, upon the request being satisfied by the surplus resources, which result from subtracting the resources allocated to the processes started in the execution space from the resources allocated to the execution space, the resources included in the surplus resources to the process, and wherein the second resource manager, upon the request not being satisfied by the surplus resources, communicates with the first resource manager to allocate the additional resources from that which is assigned to the predetermined operating system, and wherein the second resource manager allocates the additional resources, included in the surplus resources and the resources obtained additionally in response to the request for the additional resource allocation, to the process.

8. The information processing apparatus according to claim 7, further comprising an interface operative to connect a predefined peripheral apparatus, wherein the first resource manager generates access information required for the access of a process executed in the execution space to the peripheral apparatus connected to the interface and transmits the access information to the second resource manager which belongs to the execution space, and the second resource manager stores the received access information and notifies, in receiving the request for accessing the peripheral apparatus from the process executed in the execution space to which the second resource manager belongs, the process of the access information.

9. The information processing apparatus according to claim 7, further comprising a storage unit operative to store a limitation information table which associates limitation information predefined in relation with the resource allocation to the execution space by the first resource manager and fixed ID information, supplied to the execution space in advance, wherein in allocating the additional resource to the execution space, the first resource manager obtains, by referring to the limitation information table based on the fixed ID information of the execution space, an addition unit, which is a unit of amount of additional resources included in the limitation information and allocates a positive integral multiple of the addition unit of resources, additionally.

10. The information processing apparatus according to claim 9, further comprising an ID information manager operative to convert provisional ID information of the execution space to which the second resource manager belongs, the information being included in the request signal for additional resource allocation from the second resource manager, into the fixed ID information of the execution space, wherein the first resource manager refers to the limitation information table, based on the fixed ID information obtained from the ID information manager.

11. The information processing apparatus according to claim 9, wherein correspondence between the fixed ID information of each execution space and at least one of: a) the addition unit of amount of memory allocatable to the execution space; and b) the addition unit of CPU time allocatable are written in the limitation information table stored in the storage.

12. The information processing apparatus according to claim 7, further comprising a storage unit operative to store a limitation information table which associates limitation information predefined in relation with the resource allocation to the execution space by the first resource manager with fixed ID information, supplied to the execution space in advance, wherein in allocating the additional resources to the execution space, the first resource manager obtains, by referring to the limitation information table based on the fixed ID information of the execution space, an allocatable range of the resources and allocates resources additionally in the allocatable range.

13. The information processing apparatus according to claim 12, further comprising:
an ID information manager operative to convert provisional ID information of the execution space to which the second resource manager belongs, the information being included in the request signal for additional resource allocation from the second resource manager, into the fixed ID information of the execution space,
wherein the first resource manager refers to the limitation information table, based on the fixed ID information obtained from the ID information manager.

14. The information processing apparatus according to claim 12, wherein correspondence between the fixed ID information of each execution space and at least one of: a) maximum amount of memory allocatable to the execution space; b) maximum allocatable CPU time;
c) ID information of an available device and d) maximum allocatable hard disk space, are written in the limitation information table stored in the storage.

15. A computer program product contained on a non-transitory, computer-readable medium, the computer program product comprising:
a generating module, which, when an application is initialized on an apparatus by a predetermined system controller of an operating system launched thereon, generates an execution space for the application, the execution space being an environment that executes the application on the predetermined operating system;
an initialization module, which initializes, in the execution space of the application, a local resource manager;
an allocating module, which causes a global resource manager of the system controller to allocate resources of the apparatus by the predetermined operating system to the execution space in advance of execution of the application;
a starting module, which starts one or more processes of the application in the execution space;
an execution space allocating module, which causes the local resource manager of the execution space to allocate the resources to each of the processes started in the execution space; and
a reserving module, which reserves surplus resources, which result from the local resource manager subtracting the resources allocated by the execution space allocating module to the processes started in the execution space from the resources allocated to the execution space, in the execution space
wherein additional resource allocation is requested from the process;
wherein the local resource manager determines whether or not the surplus resources, reserved in the execution space to which the process belongs, satisfies the request for the additional resource allocation, and upon the surplus resources not satisfying the request, the local resource manager requesting to the global resource manager to allocate additional resources to the execution space, and
wherein the local resource manager allocating the additional resources, included in the surplus resources reserved in the execution space and the resources allocated additionally by the global resource manager to the execution space, to the process.

16. A non-transitory computer-readable recording medium having encoded thereon a computer program, which makes a computer execute predefined functions, comprising:
initializing an application on an information processing apparatus by a predetermined system controller of an operating system launched thereon;
generating an execution space for the application, the execution space being an environment that executes the application on the predetermined operating system;
creating, in the execution space of the application, an execution space controller, including within a local resource manager;
allocating, by a global resource manager of the system controller, resources of the information processing apparatus to the execution space in advance of execution of the application;
starting one or more processes of the application in the execution space; and
allocating, by the local resource manager of the execution space, the resources allocated thereto to each of the processes started in the execution space, wherein surplus resources, which result from the local resource manager subtracting the resources allocated to the processes started in the execution space from the resources allocated to the execution space, are reserved in the execution space;
requesting the additional resource allocation from the process;
determining by the local resource manager whether or not the surplus resources, reserved in the execution space to which the process belongs, satisfies the request for the additional resource allocation;
upon the surplus resources not satisfying the request, requesting by the local resource manager to the global resource manager to allocate additional resources to the execution space; and allocating by the local resource manager the additional resources, included in the surplus resources reserved in the execution space and the resources allocated additionally by the global resource manager to the execution space, to the process.

* * * * *